United States Patent [19]

Drusinsky et al.

[11] Patent Number: 4,799,141
[45] Date of Patent: Jan. 17, 1989

[54] ELECTRONIC CONTROLLER BASED ON THE USE OF STATE CHARTS AS AN ABSTRACT MODEL

[75] Inventors: Doron Drusinsky, Herzlia; David Harel, Rehovot, both of Israel

[73] Assignee: Yeda Research and Development Company Limited, Rehovot, Israel

[21] Appl. No.: 36,526

[22] Filed: Apr. 9, 1987

[30] Foreign Application Priority Data

Apr. 18, 1986 [IL] Israel .................................. 78542

[51] Int. Cl.⁴ ............................................ G05B 11/01
[52] U.S. Cl. ..................................................... 364/141
[58] Field of Search .............................. 364/140–147

[56] References Cited

U.S. PATENT DOCUMENTS 4,691,289 9/1987 Thaden et al. ....................... 364/200

OTHER PUBLICATIONS

Statecharts: A Visual Approach to Complex Systems; David Harel; Department of Applied Mathematics, *The Weizmann Institute of Science*, Rehovot, Israel; CS84–05; Feb. 1984 (revised Dec. 1984).

*Primary Examiner*—Jerry Smith
*Assistant Examiner*—Allen MacDonald
*Attorney, Agent, or Firm*—Benjamin J. Barish

[57] ABSTRACT

An electronic controller connectible to an external system comprises: a plurality of logical networks each capable of assuming a plurality of different states and arranged according to a hierarchy of different networks according to a hierarchy of different states having a one-to-one mapping between states and networks such that any transition between two states affects the two associate networks and their respective lower-order networks. Each of the logical networks includes a storage element for storing its state, means for determining its next state, and means for receiving control signals from, or for outputting control signals to, the immediately higher level logical network and the immediately lower level logical network for determining their respective states. At least some of the logical networks include means for receiving control signals from, or for outputting control signals to, the external system. The logical networks are disposed on a substrate, which includes a plurality of electrical connections connecting the logical networks to provide the one-to-one mapping between states and networks.

9 Claims, 28 Drawing Sheets

FIG 1a Moore Machine
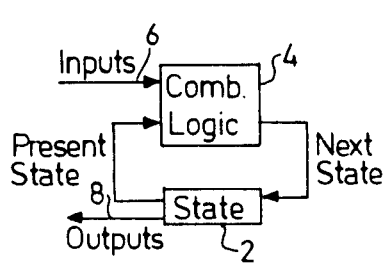
FIG 1b MEALY MACHINE
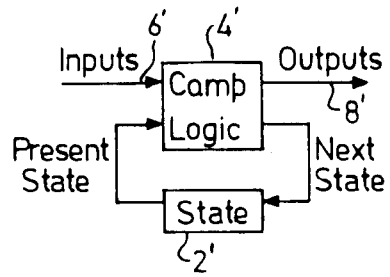
FIG 2
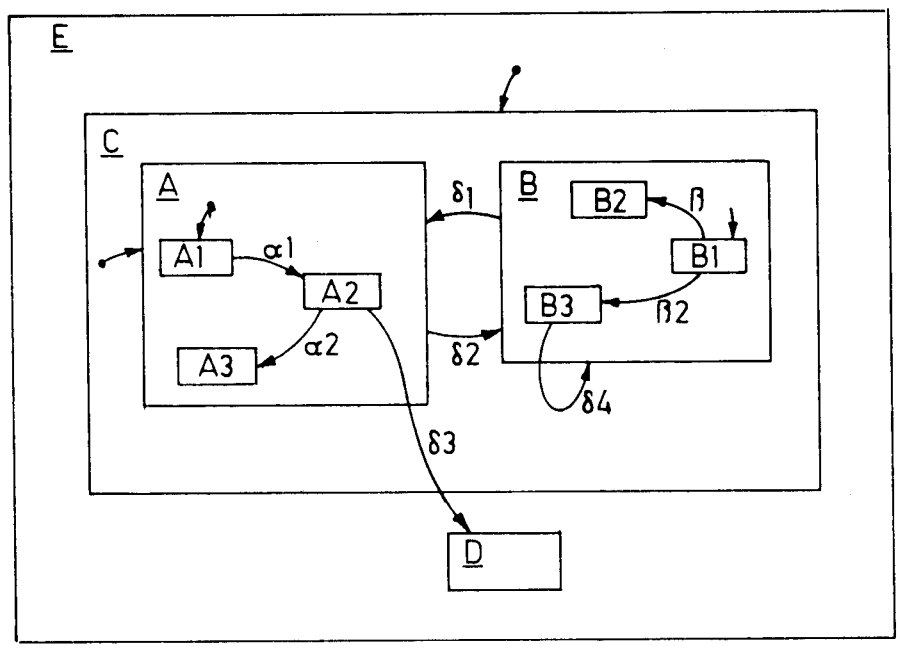

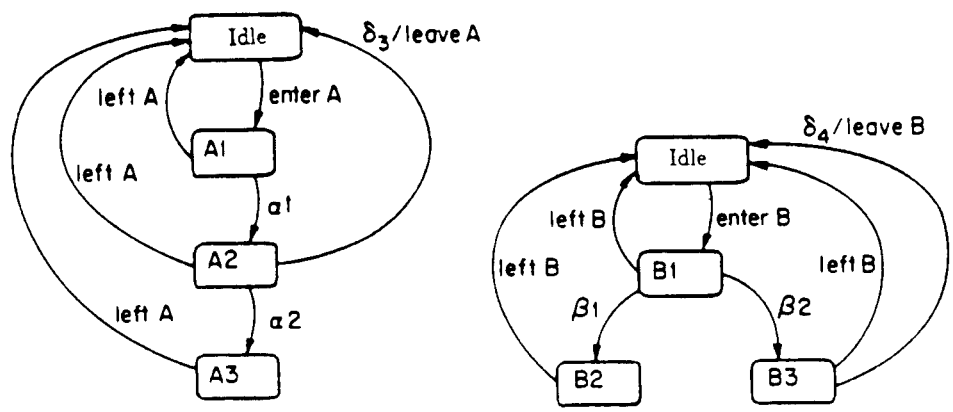
FIG 3a FSM for A       FIG 3b FSM for B
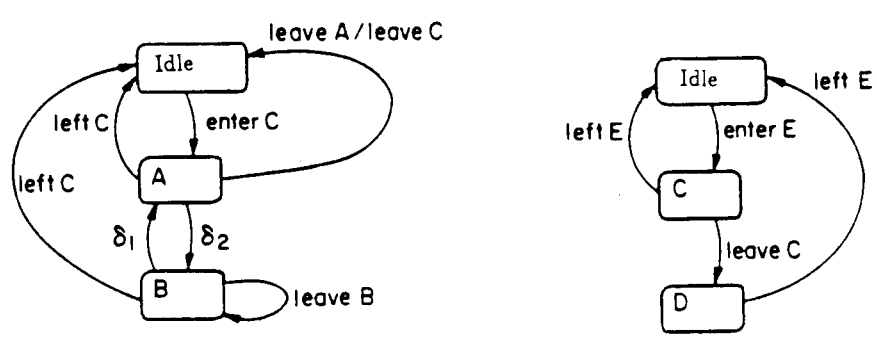
FIG 3c FSM for C       FIG 3d FSM for E
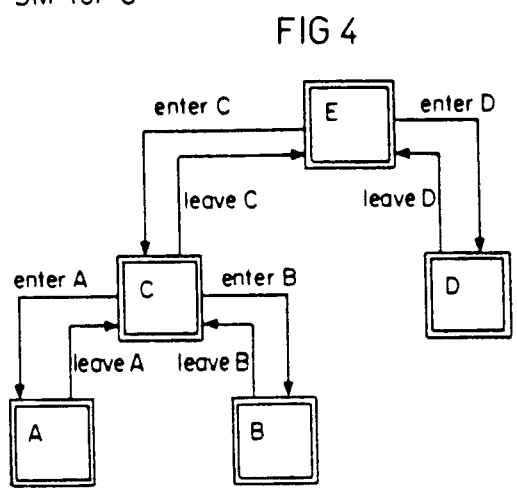
FIG 4

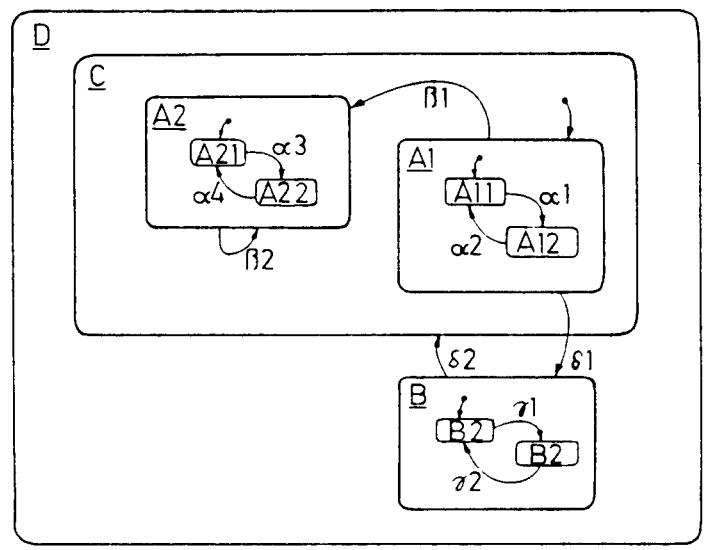
FIG 8
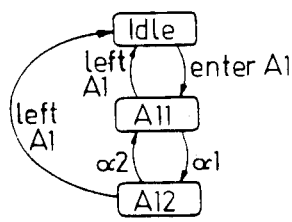
FIG 9a FSM for A1
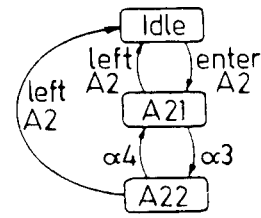
FIG 9b FSM for A2
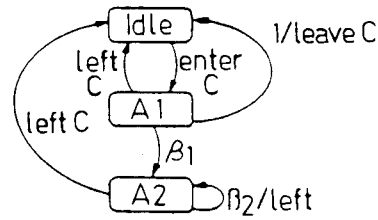
FIG 9c FSM for C
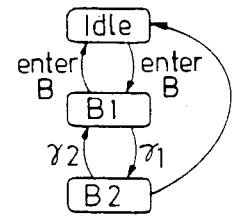
FIG 9d FSM for B
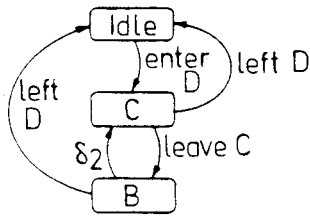
FIG 9e ESM for D

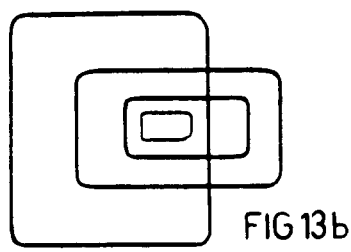
FIG 13b
Overlapping non brother states.
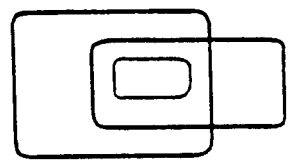
Overlapping brother states.
FIG 13a
FIG 14
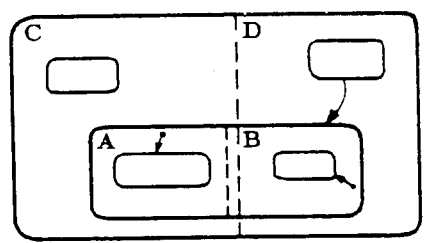
FIG 15
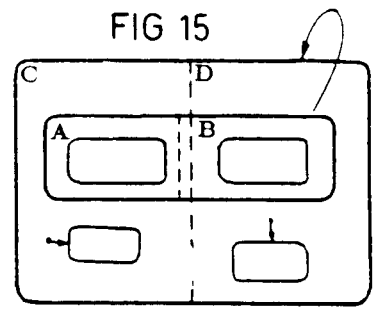
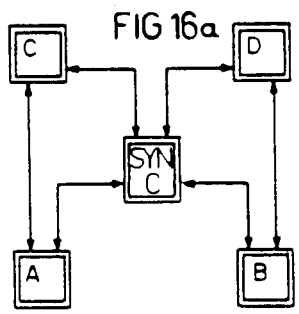
FIG 16b
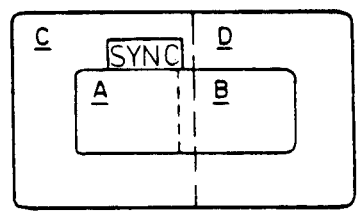
FIG 17
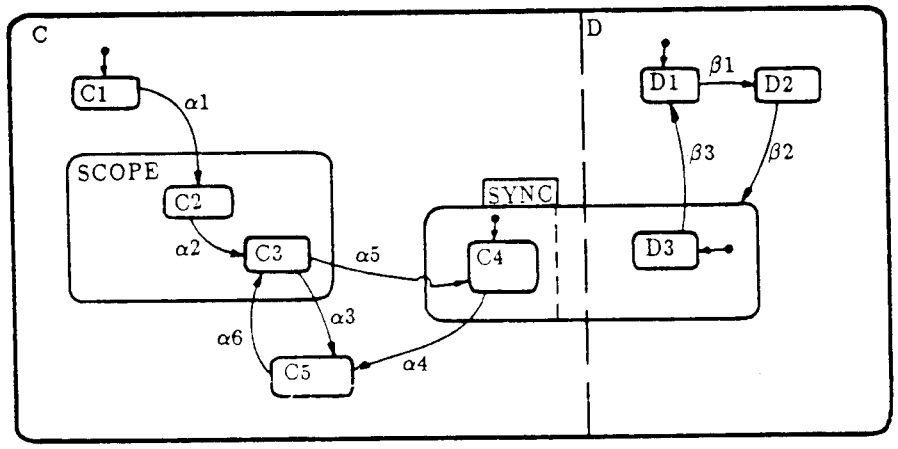

FSM for C

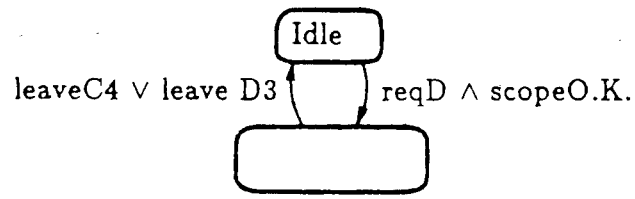
FIG 19b FSM for SYNC
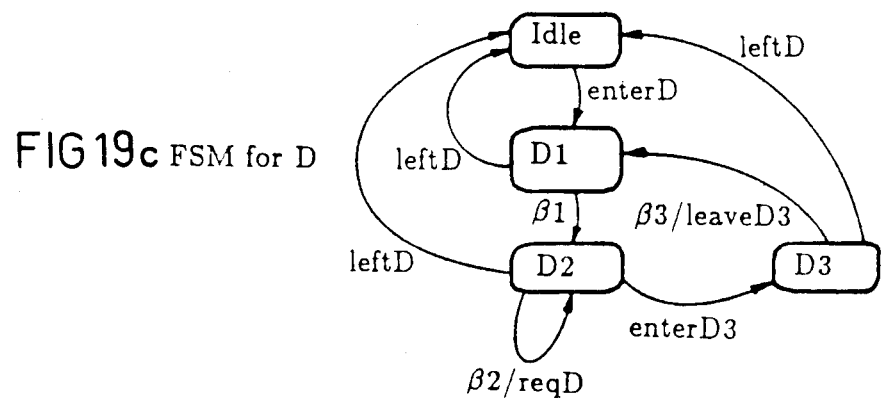
FIG 19c FSM for D
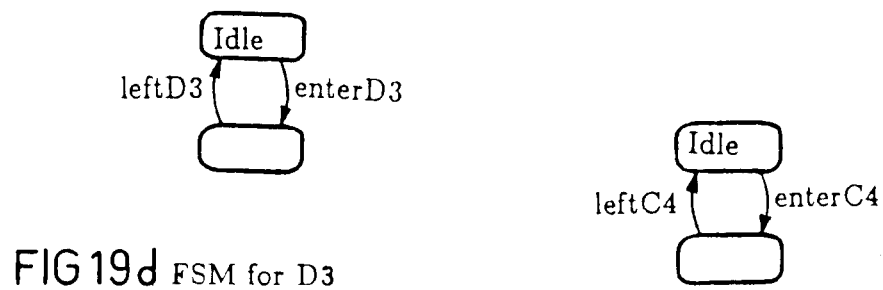
FIG 19d FSM for D3
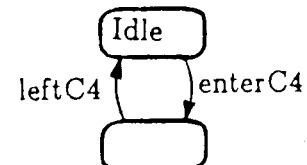
FIG 19e FSM for C4

FSM for A

FIG 24 b FSM for B
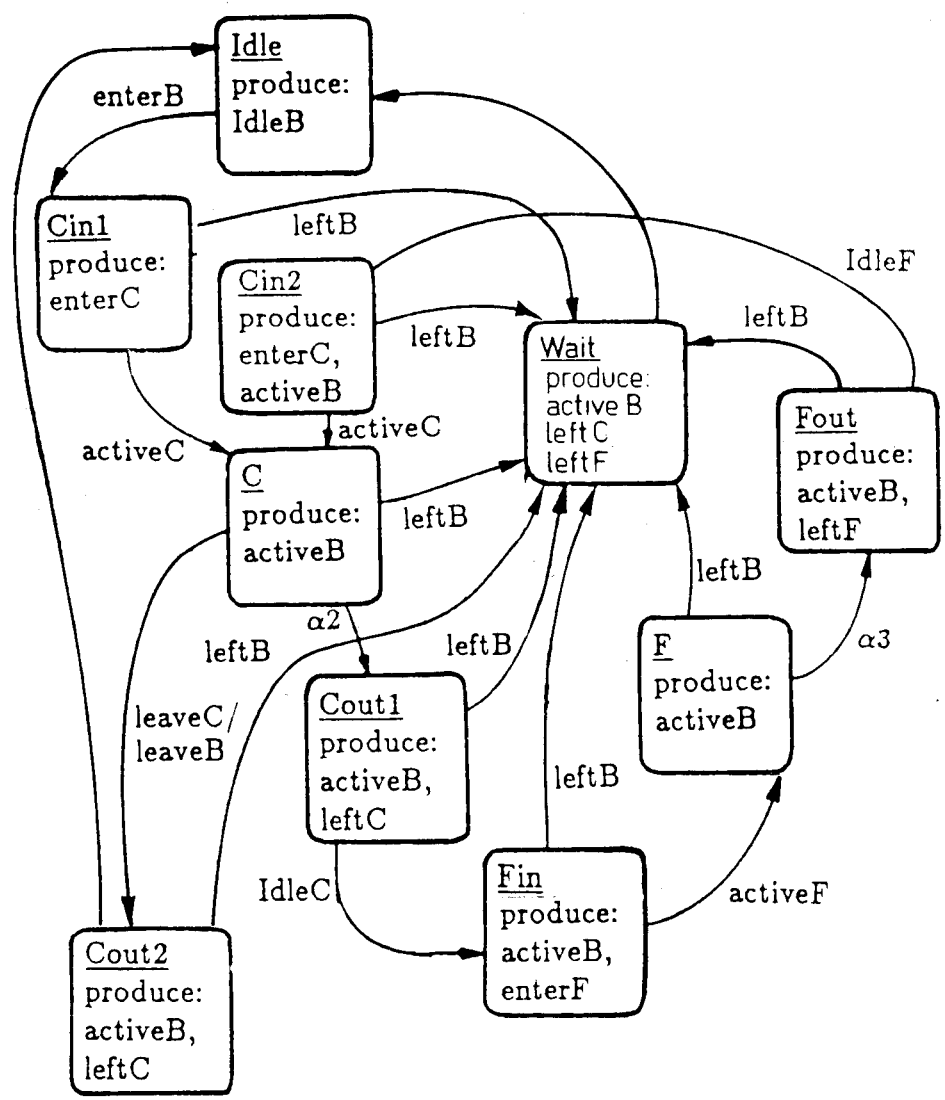

FIG 24c FSM for C
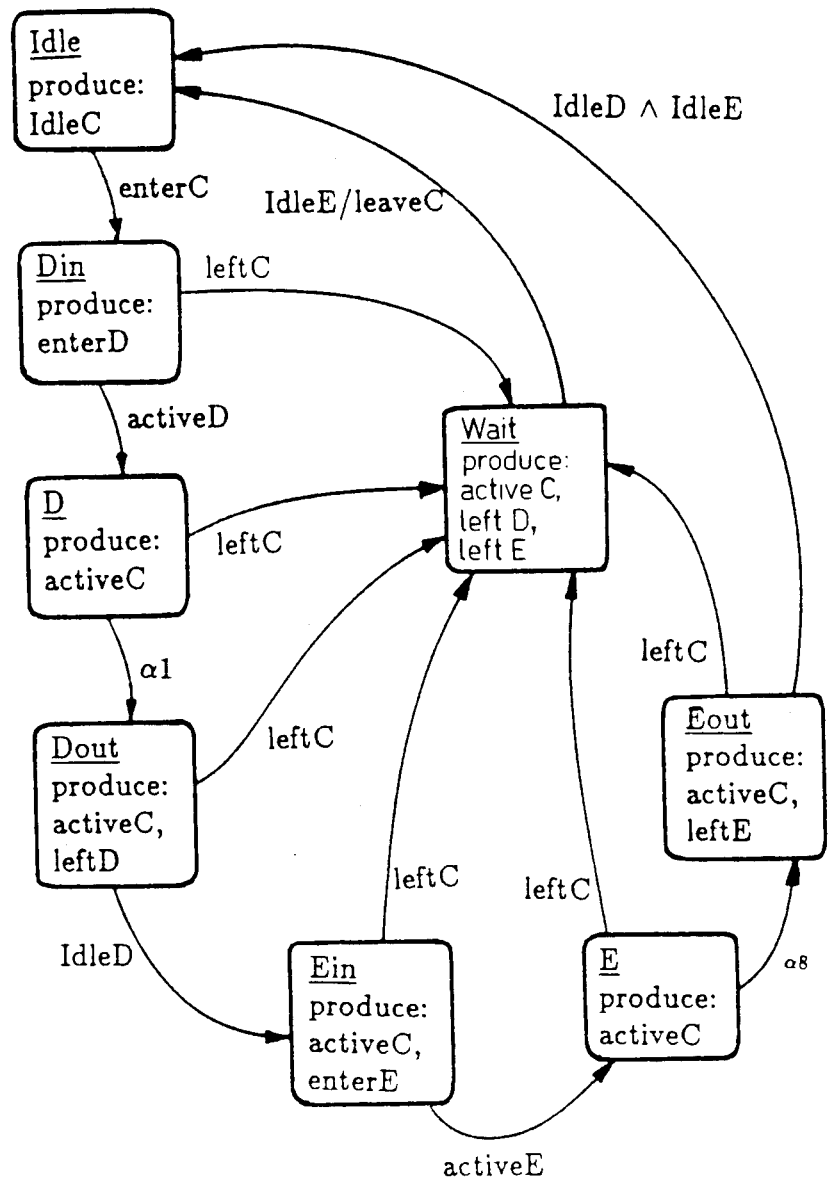

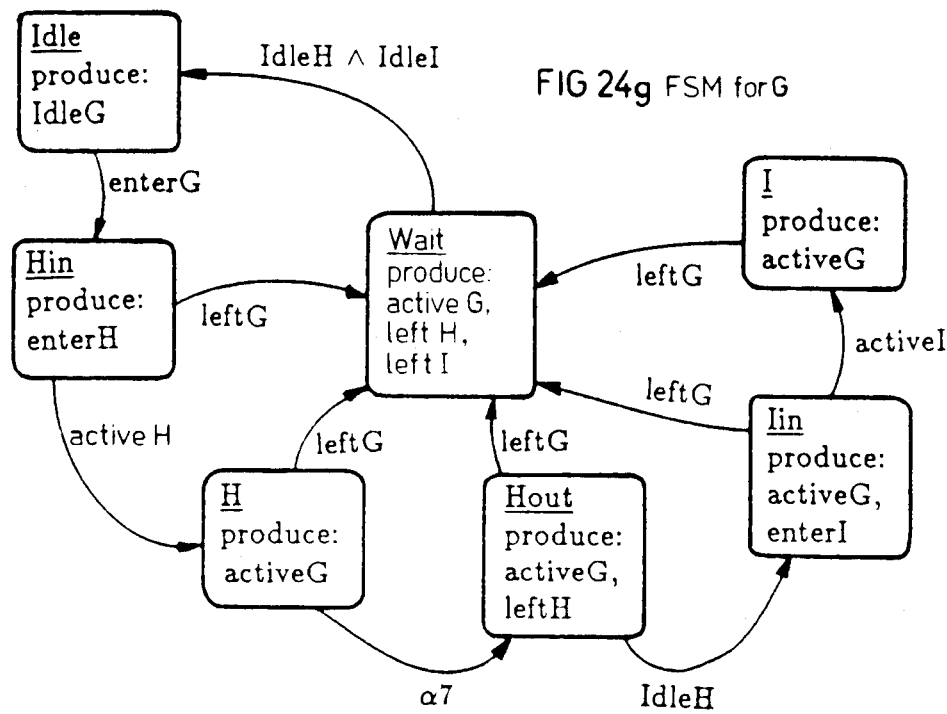
FIG 24g FSM for G
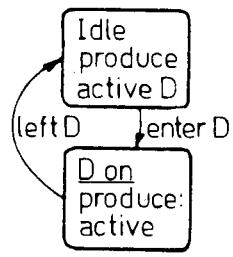
FIG 24d FSM for D
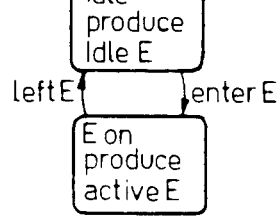
FIG 24e FSM for E
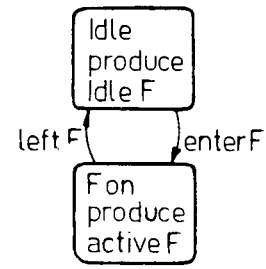
FIG 24f FSM for F
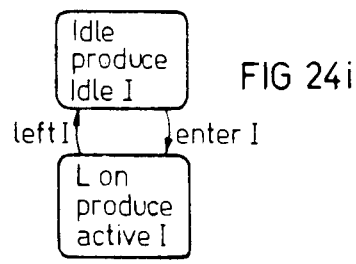
FIG 24i FSM for I
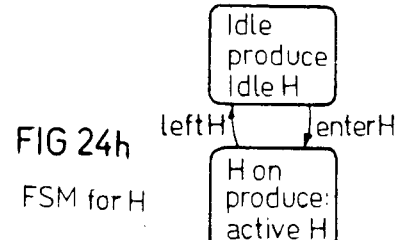
FIG 24h FSM for H FSM for CONTROL FSM for NORMAL_OPERATION FIG 31c FSM for MAIN
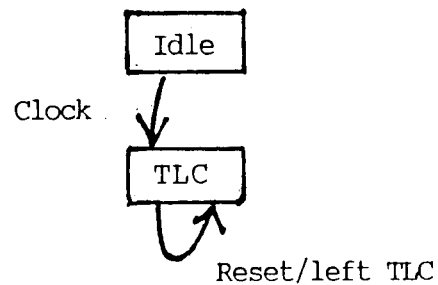
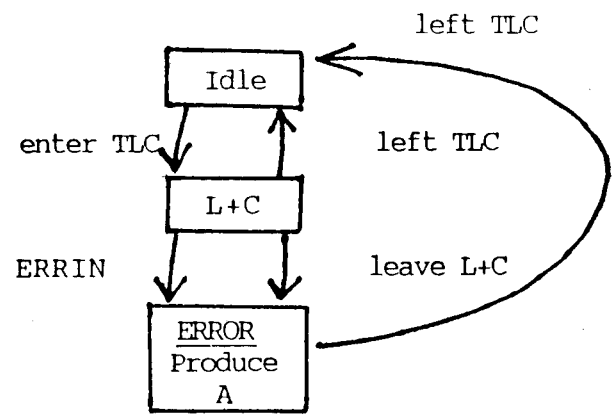
FIG 31d
FSM for TLC
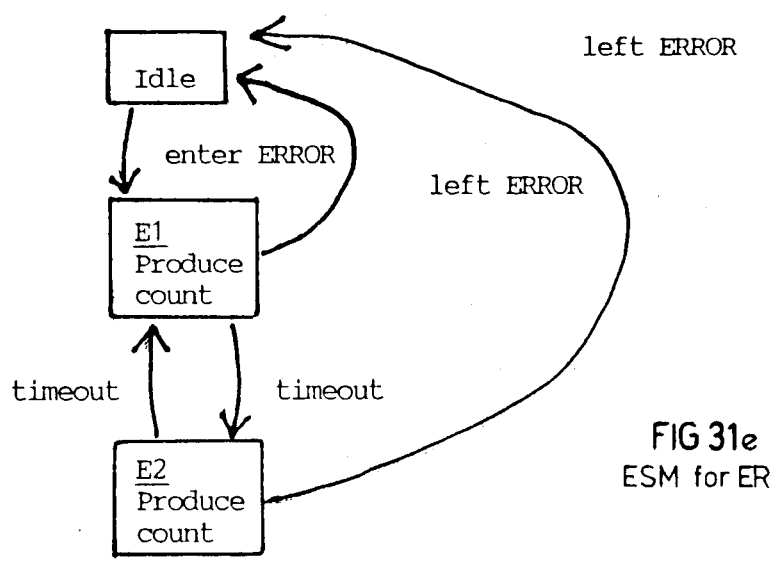
FIG 31e
ESM for ERROR

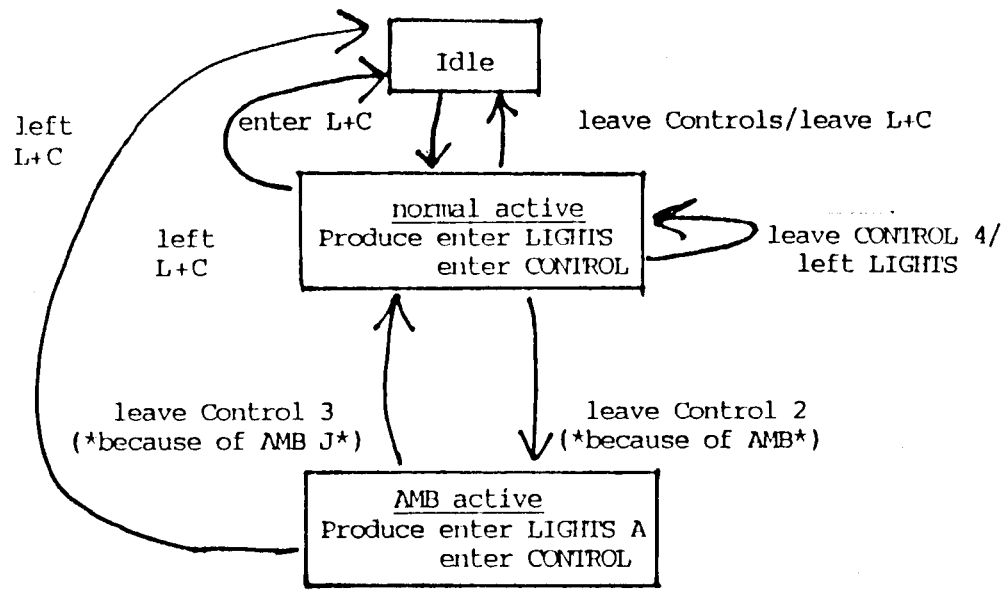
FIG 31f  FSM for L+C (lights and control)
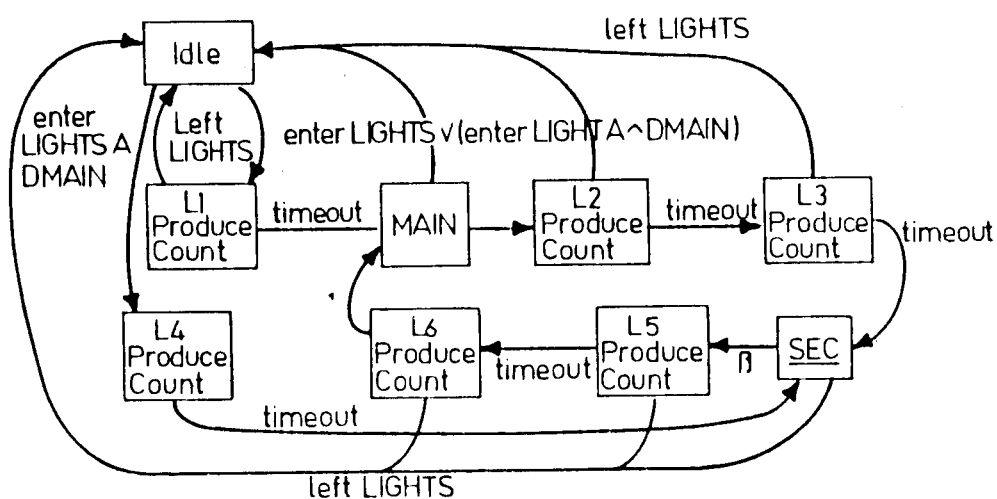
FIG 31g  FSM for LIGHTS

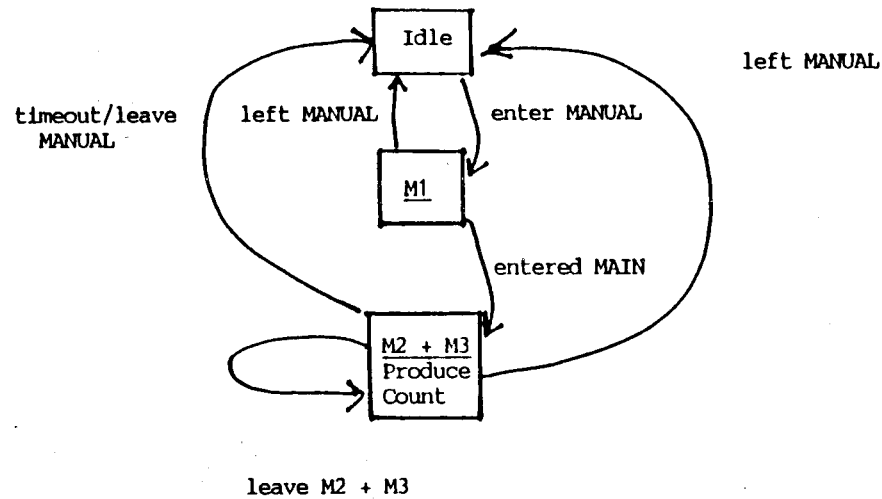
FIG. 31h - FSM for MANUAL
COMMENT: each entry to M2 + M3 causes a count↑ event that resets the timer
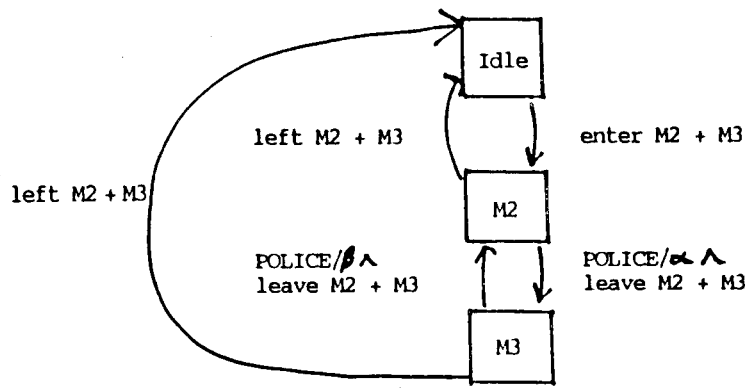
FIG. 31i - FSM for M2 + M3

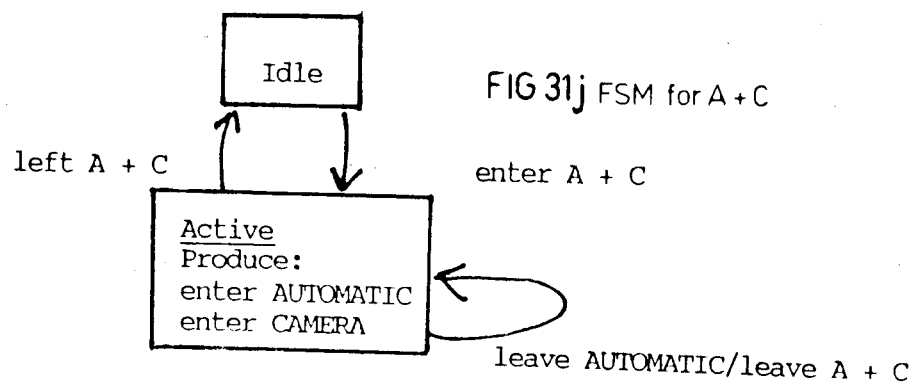
FIG 31j FSM for A + C
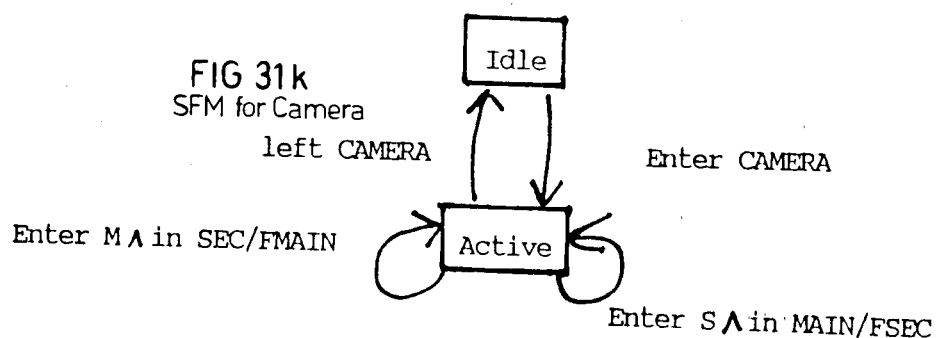
FIG 31k SFM for Camera
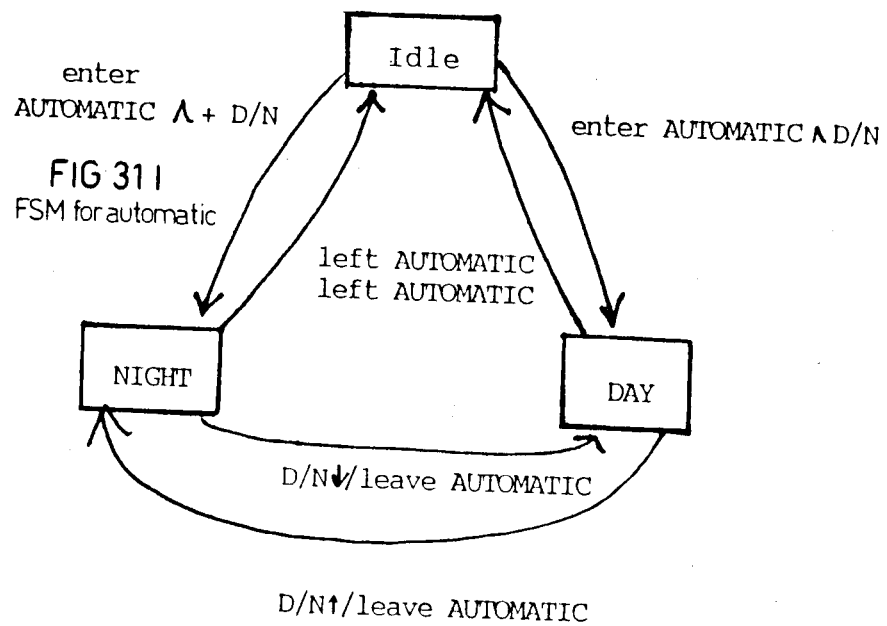
FIG 31l FSM for automatic

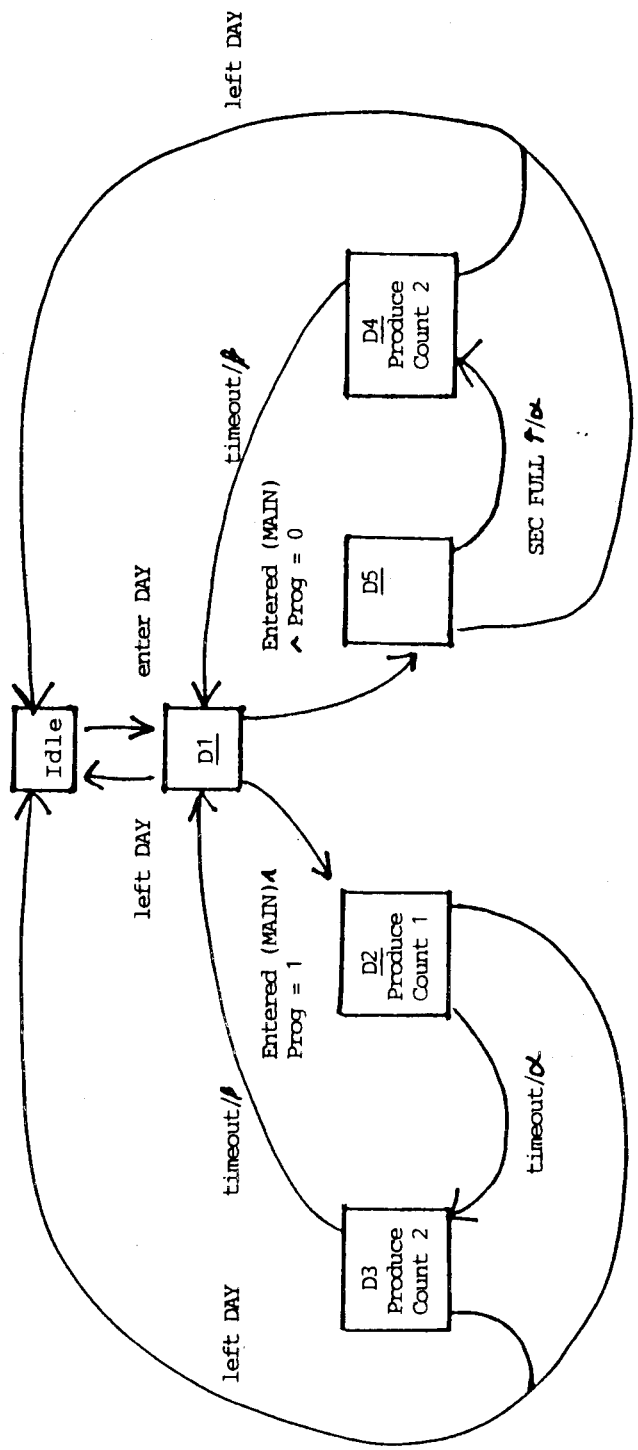
FIG. 31m - FSM for DAY

FIG 31n
FSM for NIGHT

FIG 31o
FSM for N2 to N4

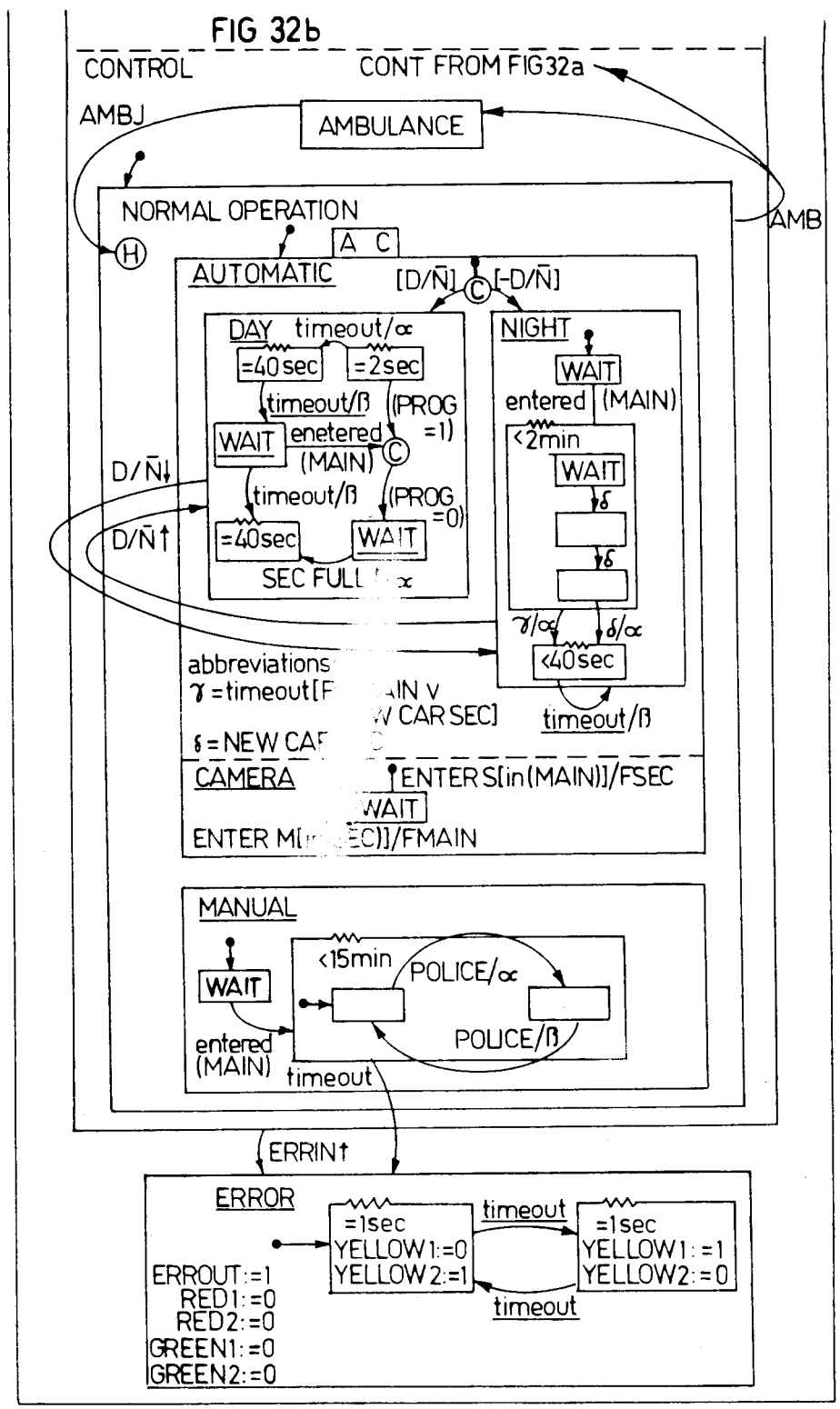

THE TRIVIAL LAYOUT OF THE TRAFFIC LIGHT CONTROLLER

NOTE: For a self timed implemention more signals should be sent between machines (the active. and table signals too)

ELECTRONIC CONTROLLER BASED ON THE USE OF STATE CHARTS AS AN ABSTRACT MODEL

FIELD OF THE INVENTION

The present invention relates to electronic controllers, and particularly to a new class of electronic controllers based on the use of statecharts as an abstract model.

BACKGROUND OF THE INVENTION

Statecharts are a recently proposed visual formalism for the behavioral description of complex systems. They are described in Harel, D., Statecharts: A Visual Approach to Complex Systems, *Science of Computer Programming* (also, *Weizmann Institute of Science*, CS84-05, February 1984, Revised, December 1984). They extend standard state diagrams in several crucial ways, and enable modular, hierarchial descriptions of system behavior in top-down, bottom-up, or mixed fashions. Statecharts were suggested as a convenient formalism for describing the behavior of reactive hardware components, enabling powerful hierarchial representations and flexible concurrency and synchronization descriptions.

Statecharts appear to be a natural extension to the classical and well-known medium of state diagrams (or finite state machines—FSM's), which have been used extensively as an abstract model for digital control units, as discussed widely in Mead C. and Conway L., Introduction to VLSI Systems, Addison Wesley, 1980. Two well-known variations of the finite state model are the Moore and Mealy machines which have typical implementations using PLA's (programmable logic arrays) for the implementation of the combinatorial logic. PLA's enable simple and regular implementations of control units but have the price of being highly area-consuming as the number of states grows. This causes them to consume more power producing larger delays which force the designers to reduce clock frequencies.

The problem of large PLA's motivated the development of several techniques for PLA optimization. Two examples of such optimizations are: (1)PLA folding Hachtel, G. D., *Techniques for Programmable Logic Array Folding*, 19'th Design Automation Conf., June 1982, pp. 147-155; and (2) PLA partitioning, Ullman, J. D. Computational Aspects of VLSI, *Computer Science Press*, 1984. Both techniques, when considered in their full generality, are NP-complete, and thus heuristics are required for them to work in practice. An attempt to reduce PLA sizes using hierarchy can be found in Ayers, R., Silicon Compilation—A Hierarchical Use of PLA's In: 16'th *Design Automation Conf.*, June 1979, pp. 314-326, utilizing a rather low level description language. Hierarchy is recommended in the above-cited Mead C. and Conway L. publication as a technique for reducing the complexity of system design but is used in conventional computers only in a limited way.

Another major problem concerning the FSM model is its limited ability to treat concurrency, a feature discussed widely in Drusinsky, D. Harel D., Using Statecharts for Hardware Description, *Weizmann Institute of Science*, CS85-06, June 1985.

BRIEF SUMMARY OF THE INVENTION

The present invention is based on the concept of using statecharts as an alternative abstract model for designing electronic controllers.

According to the present invention, there is provided an electronic controller connectible to an external system comprising: a plurality of logical networks each capable of assuming a plurality of different states and arranged according to a hierarchy of different networks according to a hierarchy of different states having a one-to-one mapping between states and networks such that any transition between two states affects the two associate networks and their respective lower-order networks; each of the logical networks including a storage element for storing its state, means for determining its next state, and means for receiving control signals from, or for outputting control signals to, the immediately higher level logical network and the immediately lower level logical network for determining their respective states; at least some of the logical networks including means for receiving control signals from, or for outputting control signals to, the external system; the logical networks being disposed on a substrate; and a plurality of electrical connections on the substrate connecting the logical networks to provide the one-to-one mapping between states and networks.

Further features of the invention, as well as the many advantages provided by the invention, are set forth more fully below.

BRIEF DESCRIPTION OF THE DRAWINGS

The invention is herein described with reference to the accompanying drawings, wherein:

FIGS. 1a and 1b illustrate two implementations of a finite state machine (FSM) model;

FIG. 2 illustrates a statecharts example;

FIGS. 3a-3d illustrate the individual FSM's for the statecharts example of FIG. 2, an output along a transition being created by the transition FIG. 4 illustrates the machine configuration for the example of FIGS. 2 and 3a-3d;

FIG. 8 illustrates another statecharts example;

FIGS. 9a-9e illustrate the finite state machines (FSM's) for the statecharts example of FIG. 8;

FIG. 13a illustrates overlapping non-brother states, and FIG. 13b illustrates overlapping brother states, in a statechart;

FIG. 14 illustrates a synchronized entry in a statechart;

FIG. 15 illustrates a synchronized exit in a statechart;

FIGS. 16a and 16b illustrate the processor connection scheme and statechart description, respectively of the general synchronizer in a statecharts-designed electronic controller;

FIG. 17 illustrates a statechart synchronization example;

FIGS. 19a–19e illustrate the finite state machines (FSM's) for the example of FIG. 17;

FIGS. 24a–24i illustrate the FSM's for a self-timed implementation of the statechart of FIG. 23;

FIGS. 32a and 32b, taken together illustrate a statechart for the traffic light controller of FIG. 30;

DESCRIPTION OF THE INVENTION

Design Methodology

The basic concept, as briefly described above, is to use a net of interconnected machines or logical networks implementing a statechart instead of a single machine implementing a finite state machine (FSM's) as in the conventional approach. Briefly, this is done by arranging the logical networks, each capable of assuming a plurality of different states, according to a hierarchy of different networks and according to a hierarchy of different states, and effecting a one-to-one mapping between states and networks.

Following is a description of the design methodology used; this description assumes a bound on the degree of the statechart tree, i.e., a bound on the number of 'sons' that a 'father' state can have.

The first stage is to build the basic machines. Every state at every level of the hierarchy is represented by a machine implementing the immediate FSM one level beneath, such that there is a one-to-one mapping between states and networks. Thus, any transmission between two states affects the two associate networks and their respective lower-order networks.

FIGS. 1a and 1b. schematically illustrate a Moore machine, respectively. Each includes a logical network having a storage element 2,2' for storing its state, means 4, 4' for determining its next state, and means for receiving 6, 6' control signals and for outputting 8, 8' control signals from or to other logical networks for determining their respective states.

FIG. 2 illustrates a statechart description of a controller comprised of a plurality of such FSM's; and FIGS. 3a–3d illustrate the individual FSM's for the controller of FIG. 2. In FIGS. 3a–3d, an output along a transition is created by the transition itself; and in FIGS. 2 and 3a–3d, the left signal is the negation of the enter signal.

Figure 5A:
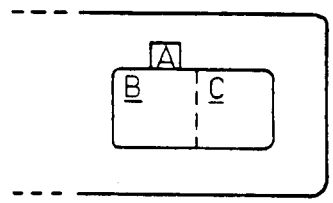
FIGS. 5a and 5b illustrate a description and implementation, respectively, of orthogonal states in the machine configuration of FIG. 4.
Figure 5B:
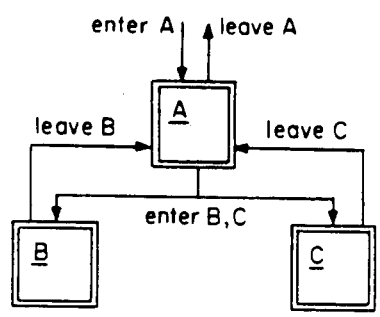

Thus for the statechart of FIG. 2, four machines are built, implementing the four FSM's of FIG. 3. The machine connection scheme is illustrated in FIG. 4. An event "enter X" is created by the machine one level higher in the hierarchy, when it reaches the state X. It would therefore seem that the best state coding would be a one bit code, where each state has its unique representing bit and thus very little logic is needed for decoding and encoding. The "left" signals are actually the negation of the "enter" signals, and notify the lower level machines to move to their Idle state. The "leave" signals, running between machines, are created by the lower level states, to notify their predecessors about their termination, such as A2 notifying A in FIGS. 2, 3. Concurrency is implemented in a natural manner as illustrated in FIGS. 5a and 5b.

This "horizontal" coding scheme seems exponentially expensive in comparison to the usual "vertical" coding scheme, but since this coding is per machine (each of limited size), its cost is bounded. A PLA's area is, on the other hand, determined mainly by the number of minterm lines, which are in the order of $n^2$ (n is number of states), one minterm for each transition in the FSM. Thus even without considering I/O wires, the expected PLA area will be $O(n^2 \log(n))$, whereas by the methodology of the present invention the number of minterms is determined by the largest sub-machine, and the intra-machine connections. In this connection, input alpha-bets are disregarded, because they are small, relative to the number of states, and many times even of constant size.

The advantages of this hierarchical implementation methodology include reduced area and power consumption, a natural implementation scheme for the concurrency and synchronization description capabilities of statecharts, and for the history operator (using the local state storage devices to hold return addresses), an even increased clock frequency based on reduced clock cycles needed for small PLA's. These advantages are more fully discussed below.

Timing Problems

Figure 6A:
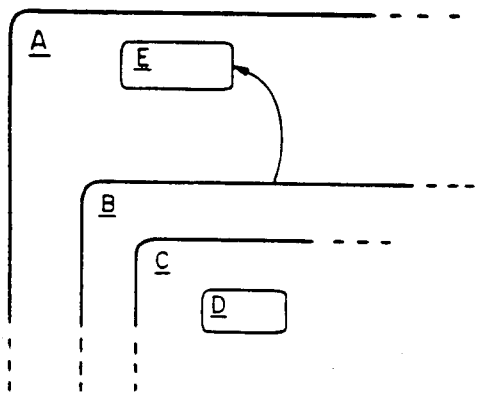
FIGS. 6a and 6b illustrate a statechart example and the processor connection scheme, respectively, of a timing problem.
Figure 6B:
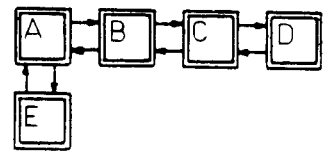

Several timing problems can occur in the example of FIGS. 2–4. The natural choice is to implement each individual FSM using a Moore machine. Thus, for example, it will take several cycles for the event 3 at A2 (FIG. 3a) to propagate up to E's machine (FIG. 3d) and cause the transition to state D, a delay which is in conflict with an intuition that such a transition should be instantaneous in a synchronous system. Similar time delays will occur when a lower level machine enters its first state after the parent transferred its state (such as B entering B1 after C moved from A to B, in FIG. 2), or when lower level states are terminated by a transition from their father (such as A1, A2, A3 being left by the transition 2 from A to B). These timing problems become vital in an example such as that of FIGS. 6a, 6b, where the time it takes for D to get the message that it should terminate might be so large as to cause a situation where D is active after E has become active.

Various solutions can be found to these problems. Two are discussed below.

Figure 7:
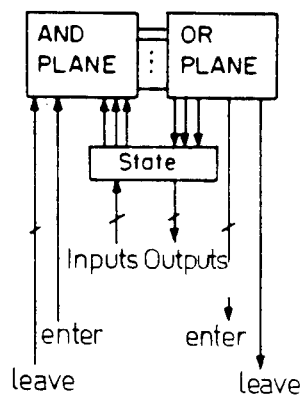
FIG. 7 illustrates a programmable logic array (PLA) implementation of a Mealy/Moore machine.
Figure 10:
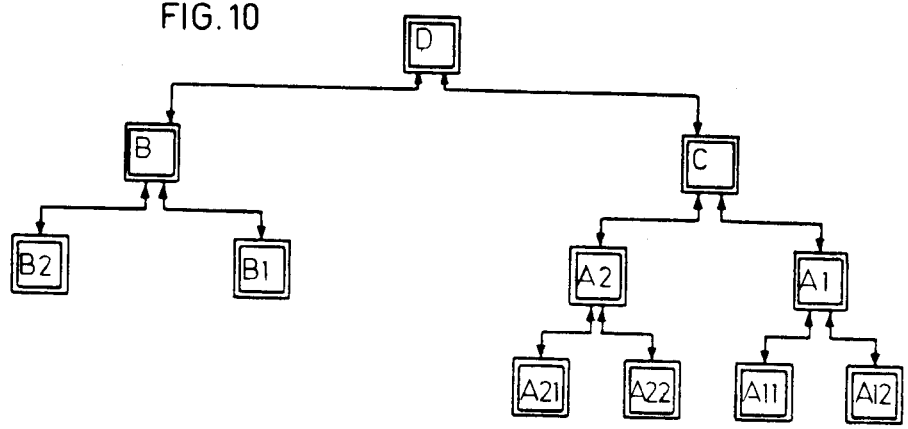
FIG. 10 illustrates a processor connection squeme for the example of FIGS. 8 and 9a-9e.
Figure 11:
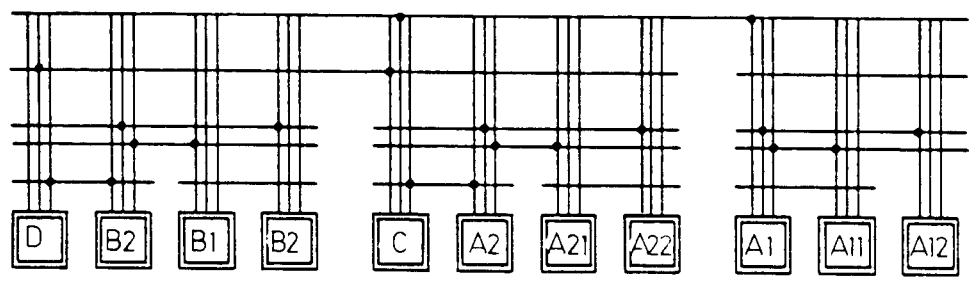
FIGS. 11 and 12 illustrate two alternative layouts for the processors of FIG. 10.

The first is to implement the basic FSM as a combination of a Mealy machine with a Moore machine; this is illustrated in FIG. 7. The machine is actually a Moore machine with asynchronous "leave" and "enter" (input and output) signals, which will propagate up or down the hierarchy using asynchronous logic rippling. No spikes (non-valid output signals, created because of several non-synchronized input signal transitions) will occur. This solution solves the mentioned timing problems at the global price of cutting down the clock frequency so that such asynchronous signals will be able to propagate up or down the whole hierarchy in one cycle. Thus, the clock period should be $O(n \log (n))$ for the two regular layouts described below with respect to FIGS. 8-12. A much larger asymptotic delay ($O(n^2)$)) is found in a conventional PLA because of its long wires.

The second solution is rather straightforward and involves connecting each "leave" or "enter" wire to all the involved descendents, cutting down delays at the expense of larger layout area. However, since communication will still take $O(n)$ time units, there is no practical point in this solution.

Layout

First discussed is the manner of laying out simple tree-statecharts. Using the above-described methodology, a tree can be created for which there is an $O(n)$ area (n is the number of vertices (nodes) in the tree) layout using the layout algorithm in Leiserson E. L., Area Efficient VLSI Computation, *MIT Press* 1983. This layout is, however, not as regular as the PLA, both in its general structure and in the output lines which are not taken into consideration in the algorithm (although there is a possibility of slicing through the layout and routing those wires to the perimeters). Another important factor concerning this layout is the model used, in which a basic machine and a wire are of the same width, causing considerable waste.

A preferable layout can be obtained using the Configureable Layouts of Leiserson. The layout is of area $O(n \, d \log^2(n))$, where d is the maximal degree found in the tree as illustrated in FIGS. 8-11. All vertices (machines or processors) are lined up on the baseline and their connections run vertically. Parallel to the baseline are $O(\log^2(n))$ horizontal wires (each such virtual wire can be a pair of "leave" and "enter" wires). The top $O(\log(n))$ wires run all the way across the layout. The next $O(\log(n))$ wires are broken halfway, etc. The actual connections are made at selected intersection points, e.g., by 'solder dots'. This method uses the fact that any finite tree with n vertices and bounded degree d can be bisected into two sets of [n/2] and [n/2] vertices by cutting $O(\log(n))$ edges. Once the cut-set is determined, the two sets of vertices can be laid out recursively and combined by placing the edges in the cut-set as the horizontal lines in the layout.

Figure 12:
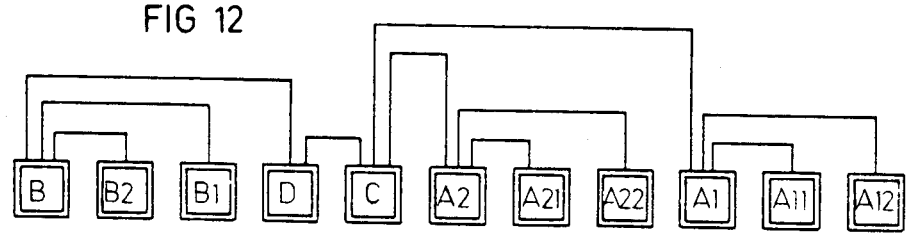

A regular $O(n \log(n))$ layout can also be achieved using the 1-separator theorem for trees as described in Leiserson (supra); this is illustrated in FIG. 12. Using this theorem, the tree is bisected into two sets each consisting between $\frac{1}{3}n$ and $\frac{2}{3}n$ vertices, by removing $O(1)$ edges. Each set is then laid out recursively along the baseline, and the removed edges are placed horizontally above.

For both of the above layout techniques, the path between two nodes is of size $O(n)$; more particularly, it will be $(n/\log(n))$ for any layout technique. The last result means that there exists a constant C for which no layout can have all its edges shorter than $(C \, n/\log(n))$. For both techniques the constant in the $O(\ldots)$ is determined by the maximum degree, d, allowed in the statechart. It determines both the maximal size of an elementary machine and the maximal cut-set in both of the recursive procedures.

The clock period for the last two layout techniques is $O(n \log(n))$ because of the $O(n)$ distance between two nodes, and the $o(\log(n))$ levels of hierarchy, mentioned earlier.

Some favorable qualities of such an approach are the following:

(1) The input and output wires to the control unit do not need routing inside the layout, because the machines are on the perimeter.

(2) The individual PLA's can be laid out in one block in a very regular way similar to the way it is carried out in regular PLA's, demanding no special solutions for the ground, voltage and clock wires.

(3) Each individual machine is small and fast, and the connection part consists only of wires; thus, its area is not measured in machine units but rather in the usual unit.

Non-Tree Statechart

Non-tree statechart enable overlapping hierarchical decompositions and unusual skips over lines, as illustrated in FIGS. 13-15.

The most simple case, is of overlapping brother states, such as in FIG. 13. Layout can be done using the previous methods but involving a larger degree, d (because a state can now have more than one parent). The more complicated type of overlapping states is illustrated in FIGS. 14-15. These statecharts are needed for different kinds of synchronization. FIG. 14 is an example of a synchronized entry to A, B from the scope of C. FIG. 15 is a synchronized exit from A, B if we are in both. These typical synchronizations can be implemented using the same ideas presented previously.

The general synchronizer is presented in FIG. 16. For the case of a synchronized entry, C and D send messages to notify Sync about their present state, and Sync decides accordingly whether to synchronize (if scope is O.K. and synchronization requested), or not. Once sync synchronizes, A, B, C and D are notified and activated, until C and D decide otherwise, and notify A, B and Sync. For a synchronized exit, a similar behavior can be created. Layout can be carried out using the same techniques discussed previously, but demanding a larger cut-set for cutting through the synchronizer block presented in FIG. 16. The cut-set grows to four edges for the worst case of cutting through the synchronizer block.

Figure 18:
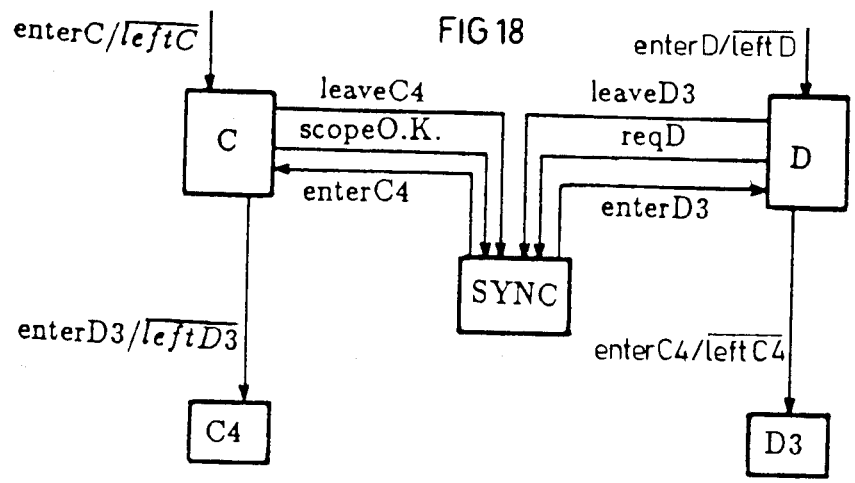
FIG. 18 illustrates a machine configuration for the statechart synchronization example of FIG. 17.
Figure 19A:
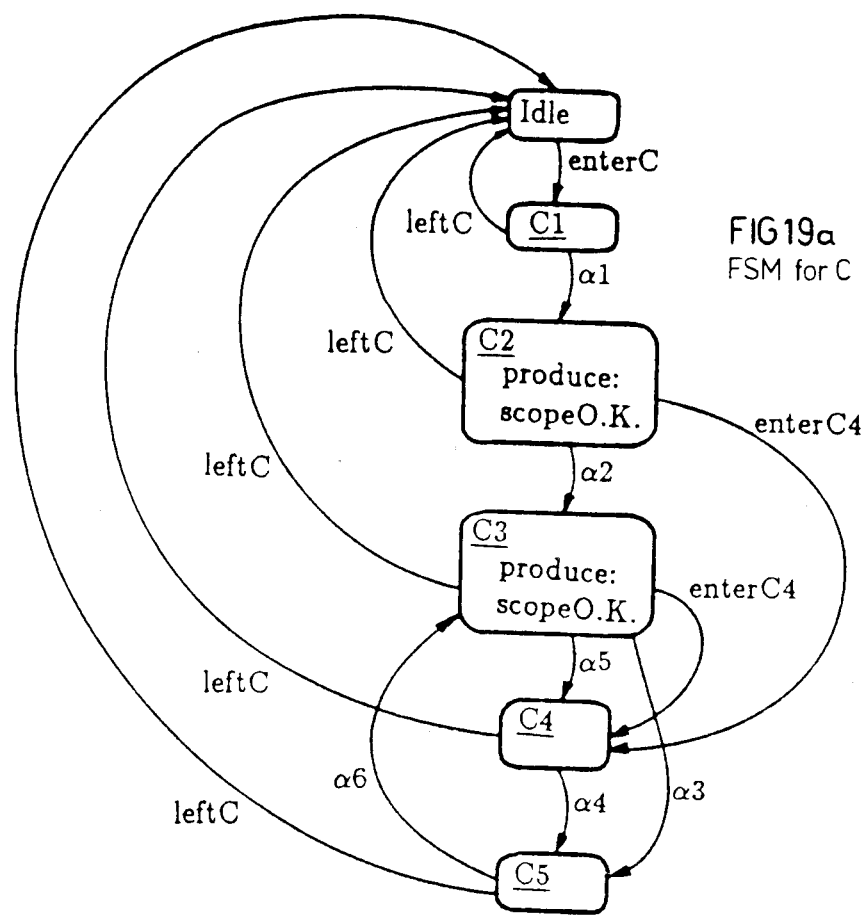

FIG. 17 illustrates a statechart synchronization example;

FIG. 18 illustrates a machine configuration for the statechart synchronization. Example of FIG. 17; and FIGS. 19a-19c illustrate the FSM's for the example of FIG. 17.

A Scheme for Micro-Programming

Figure 20:
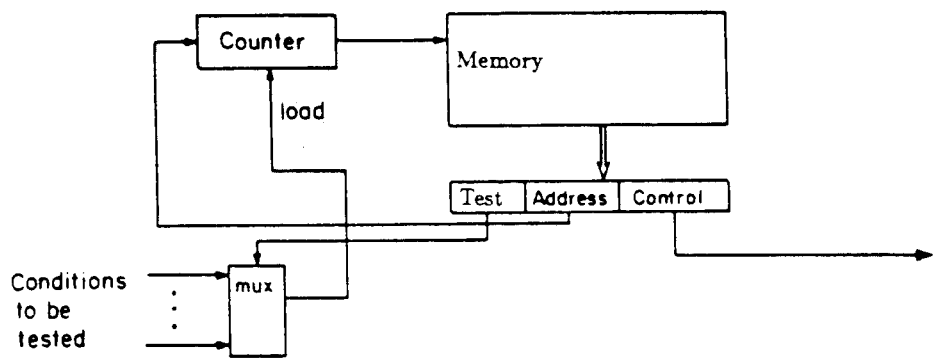
FIG. 20 illustrates a typical microprogrammed structure.

Micro-programming is another method for the implementation of the abstract FSM model. A typical micro-programming system has a counter (called micro-PC) holding the state code, and a memory holding all the FSM states, transitions and outputs, as illustrated in FIG. 20.

Figure 21:
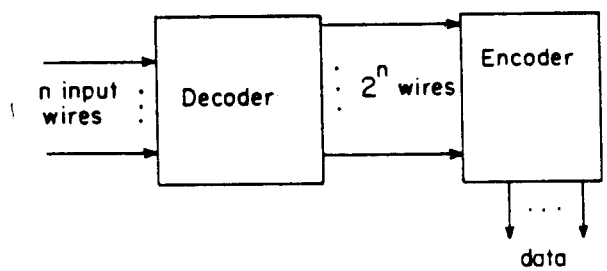
FIG. 21 illustrates a typical read-only memory (ROM)

Concerning statecharts, it is possible to use the "horizontal" code, discussed earlier, instead of an address, and thus there is no need for the decoder part in a typical ROM memory (which is built out of a decoder and encoder as illustrated in FIG. 21).

Once again, the same strategy, of synchronous machines connected hierarchically with the exception of the message wires being asynchronous, can be applied.

Real-Time Operation

Figure 22:
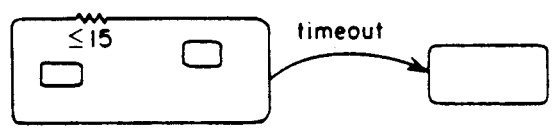
FIG. 22 illustrates a statechart timing description.

A global clocking scheme, used throughout the control unit, is the usual tool for relating to real-time. Large PLA's cause relatively large delays, and thus the above-described method might not be good enough for very precise tasks or for self-timed implementations. A different technique, using FSM's as the abstract model, is to communicate with external devices that do not appear explicitly in the behavioral description and that will treat real-time. Such a method is effective enough, but is not part of the abstract model and will harm the clarity of the behavioral description. The model of the present invention is based upon real-time constraints placed as part of the statechart behavioral description itself, as in FIG. 22. Each constraint can be simply implemented as a timer that is connected to the specific machine and which produces the appropriate events. Such a timer can be viewed as one of the machines in the statechart machine-tree, but it might then be layed-out too far away from its controlling machine. To avoid such a problem timers can be viewed, during the layout process, as part of their controlling machines.

A Self-Timed Implementation

When statecharts are used as a formalism for describing the behavior of complex systems, a self-timed implementation is necessary because of the growing communication delays that cause a global performance reduction in a synchronous implementation. A classic method for realizing asynchronous sequential circuits can be found in Kohavi, Z., *Switching and Finite Automata Theory*, McGraw Hill 1979; and Unger, S. H., *Asynchronous Sequential Switching Circuits,*. New York, Wiley-Interscience, 1969. The method is an extension of the synchronous realization technique that tries to prevent hazards and races. Some drawbacks of this method are: It requires a substantial amount of effort to find state assignments that produce hazard-free and race-free realizations; it is suitable for sequential or very limited types of concurrent machines only; and, it is suitable only for machines that operate in single-input-change single-output-change. It can be immediately noted that the last two drawbacks are a direct outcome of the FSM model. The statechart model, on the other hand, being described in a hierarchical manner, permits several simultaneous events and permits concurrent activities, and therefore permits these drawbacks to overcome, as described below.

The general concept is to implement the given statechart in a hierarchical manner according to the methodology described below. Synchronous machines are used for the individual machines, but communications between them are accomplished via a 'handshake' protocol. The only communicating machines according to the methodology are fathers and sons.

Figure 23:
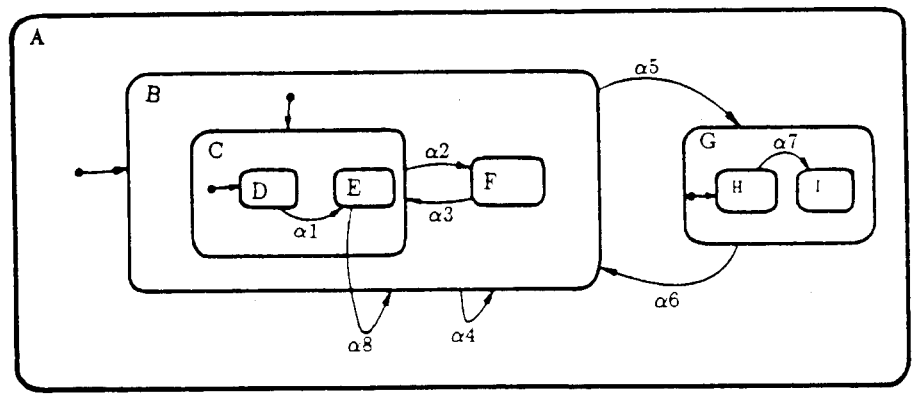
FIG. 23 illustrates a typical statechart.
Figure 24A:
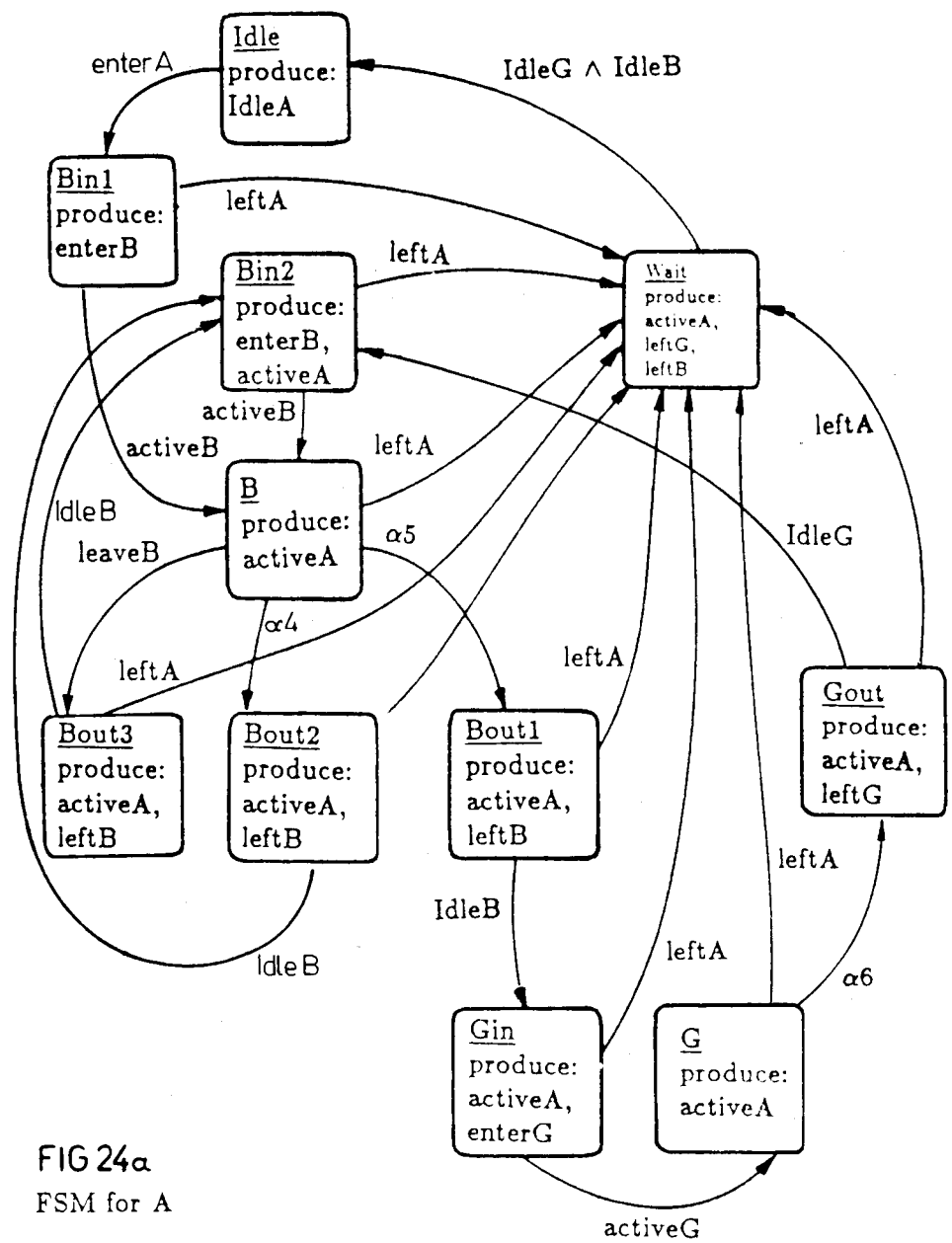

FIG. 23 illustrates a very simple case including a superstate with exclusive substates. The individual FSM's are illustrated in FIGS. 24a–24i. The following states and events have been added: A waiting state, labelled Wait0, that proceeds the Idle state; two states $X_{in}$ and $X_{out}$ for every state X; and the two handshaking signals "active" and "idle".

The Wait state is a waiting state for the machine until all its descendents move to their Idle state. The "active" signal is sent from son to father to indicate the son is active (after receiving the "enter" signal), and the "idle" signal is a signal sent from son to father to indicate the son is in the Idle state. The "enter", "left" and "leave" signals have the same meaning as in the synchronous case.

Following is a brief description of producing these states for each signal: The "enter" signal is sent from father to son X when the father has entered his $X_{in}$ substate; the "active" signal is sent from son X to father when the son is in any substate except his first two substates (namely Idle and the following substate), and if the son is an atomic machine then "active" is the negation of "idle"; the "left" signal is sent from father to his son X when the father enters the $X_{out}$ substate; the idle signal is sent from son to father when the son is in his Idle substate; and finally, the "leave" signal is sent from son to father exactly as in the synchronous case.

Communication operates in the following manner: When the father decides to enter a substate, X, it first enters the substat and produces the "enter" signal. The son, X, then leaves his Idle substate and recursively waits for an acknowledgement (the "active" signal) from his son. When this acknowledgement is received, the son can continue and acknowledge himself. The father, upon receiving the sons "active" acknowledgement signal, enters the X state itself. When the father decides to leave the X substate, it moves to the $X_{out}$ substate first, and produces the left signal. The son then moves to his Wait substate, and waits for all the "idle" signals, from his sons (recursively). When they all arrive the son moves to his Idle substate and produces the "idle" signal, and the father is free to continue moving.

Constructing communicating, self-timed machines, for a superstate containing orthogonal substates, and for synchronizing machines (as illustrated in FIGS. 14–16) is very similar.

This self-timed construction can be done at any level of the hierarchy. Hence, one can decide to realize certain superstates as synchronous self-timed elements, and the remaining statechart realization will be done using the presented methodology. Such decisions will reduce performance because of the longer clock cycles needed for the synchronous self-timed machines, but will reduce the probability of synchronization failure due to the reduced number of asynchronous handshake signals (see Mead).

For balanced statechart trees the trivial layout can be appropriate (for the self-timed case). This trivial layout technique lays out, on a straight line, the father machine and the recursive layouts of the subtrees beneath it, and then lays out, above, the communication wire between the father machine and its submachines. The worst case area for this layout is $O(n^2)$ for unbalanced trees. For balanced trees, however, the layout area is only $O(n \log(n))$, and has the advantage that, for a self-timed implementation, the low-level machines always communicate along very short wires.

A Programmable Approach

Figure 25:
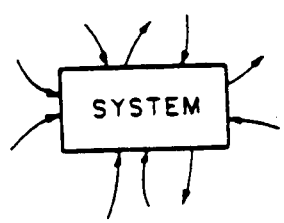
FIGS. 25–27 illustrate, respectively, a reactive system, a transformational system, and the machine configuration of a programmed chip, which figures will be helpful in understanding a described programmable approach to a statechart implementation of a controller.
Figure 26:

A reactive system is a system which is repeatedly prompted by the outside world and has the role of continuously responding to external inputs. It is distinguished from a transformational system that, globally speaking, accepts inputs, performs transformations on them and produces outputs. FIGS. 25 and 26 illustrate these two types of systems. Real-time controllers are good examples of digital reactive systems, some of which are: graphic display controllers, disc controllers, and the traffic-light controller described below.

This section discusses designing and developing digital reactive systems, and describes a new method for doing so.

There are two main approaches to the reactive system design task. The first approach is to design a special-purpose chip (or board). Such an approach has two main drawbacks:

(1) The design task is more expensive than a similar sized programming task, even if a silicon compiler is used; this is because such a task includes both the logical development and hardware generation subtasks.

(2) The description languages being used are usually tailored for hardware description rather than reactive system description.

The second approach is to use a microprocessor with an interrupt system. An interrupt is actually a built-in test, being executed prior to every machine command. Whenever the test succeeds, computation branches to a predefined location (interrupt routine). Thus, the reactive nature of the system is implemented via the interrupt utility, whereas its transformational parts are programmed and run by the processor. This method has three main drawbacks:

1. The description languages being used are usually tailored for transformational systems (for example high-level progamming languages such as PL/M or C). Such languages do not enable a precise high-level description of the reactive attributes of either the described system, or of its environment (which is a necessity for a good design methodology).

2. Microprocessors do not, usually, enable real concurrency but only time-sharing. Hence, for real concurrency a hardwired parallel system must be created. Furthermore, the interrupt system must be completely deterministic; namely the interrupts must be designed so that either interrupts will not occur simultaneously, or a priority mechanism will cause a deterministic behaviour. In this respect, it should be noted that non-deterministic behaviors, with n states, will be simulated by a deterministic behavior with up to $2^N$ states and transitions.

3. Realizing a reactive system using this methodology is not as simple as expected from a programmable approach, because of two main reasons. The first is the fact that apart from the transformational programming task, which can be carried outdirectly from the high-level description using a compile, there is another task of tailoring the reactive behavior into the design. This behavior is not described in the high-level description language but rather in a low-level form, or even at implementation level (using the interrupt system to describe the reactive behavior). While there are design methodologies for the transformational parts of the system, there are few, or none at all, for the reactivity part. The second reason for the relative complexity of programmed reactive system realization is the complexity of the interrupt system itself. This mechanism is usually hardwired, not flexible, and hard to follow and understand especially as the system grows.

It can therefore be seen that there is a need for a reactive system description language that will enable an efficient, simple and fast realization of the desired system from its description. Statecharts, when used as such a language and when coupled with a programmable component described below, enables the desired realization.

Figure 27:
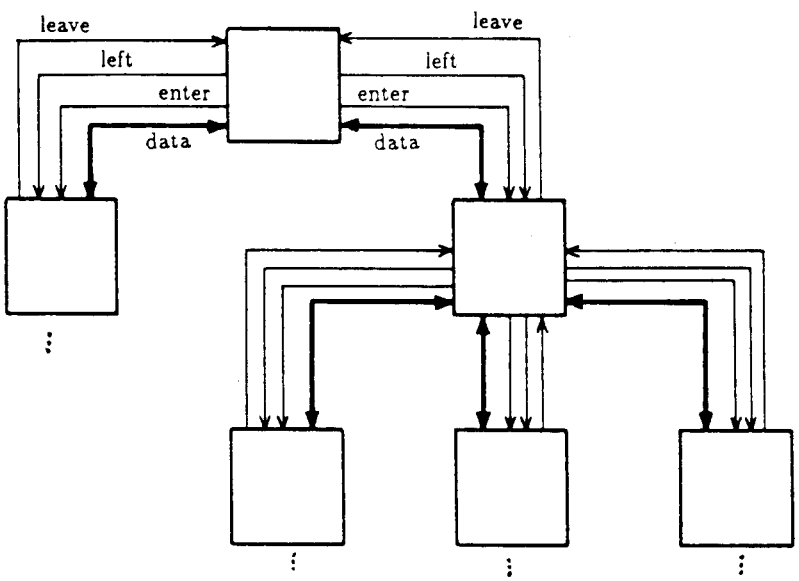

FIG. 27 illustrates the machine configuration of a chip after being programmed to form a hierarchical machine-tree. The hierarchical machine-tree behaves in a different manner than the conventional one. Here each machine implements a superstate in the statechart, and the machines connected beneath it implement its sons. Naturally any transition from a superstate will cause the appropriate machine and its descendants to stop. The difference between this programmable version and the methodology presented earlier is that each superstate (which will be implemented as an FSM) will be programmed into memory, rather than hardwired. Like the original machine-tree, each machine can be a conventional Von-Neumann machine with local memory, and a data connection between them as in FIG. 27 (and even with a local timer for the statechart hierarchial timing notation). There will be, however, a control connection between a machine and its descendents as well. This connection consists of the enter, left, and leave signals, (and the idle and active signals, for the self-timed implementation) that are part of the methodology described earlier.

A different possibility is to have the machines in the machine-tree be only finite state machines which produce signals to a common processing and data unit, and then only control wires will appear in FIG. 27.

Figure 28:
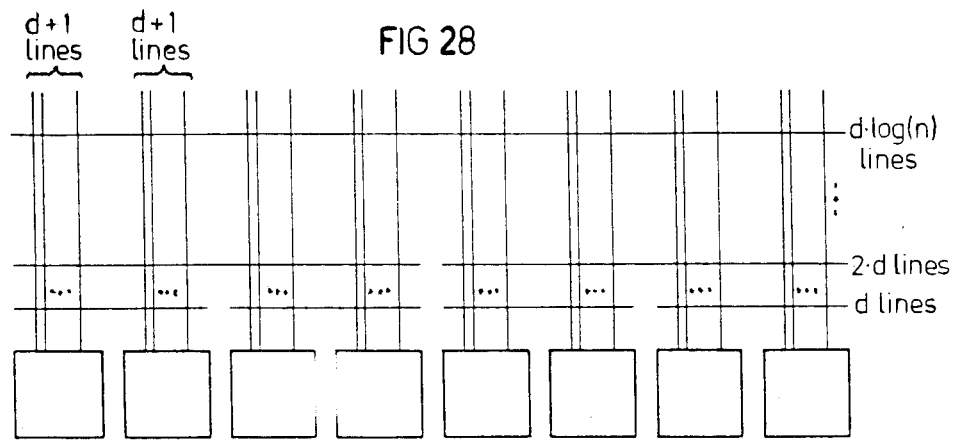
FIG. 28 illustrates a general purpose tree layout to a programmable approach.

In the methodology described above, the machines are hardwired together, whereas here the presented machine is programmable. Programmers may wish to define different tree structures. Hence, the chip's most convenient layout is the O(n d log²(n)) layout discussed above, and is illustrated, in its general form, in FIG. 28.

This technique enables the manufacturer to create general-purpose chips for which the specific machine structure can be easily determined by adding the appropriate contact cuts. Dynamic (run-time) machine-structure programming, which will enable the implementation of several statecharts on one machine, can be achieved using switches instead of permanent contact cuts. Concurrency, in the form of orthogonal states, is achieved by programming the chip so that two or few machines are mapped together as one substate. Hence the layout technique enables a flexible machine definition including hierarchial relationships, concurrency, and even shared states by connecting a machine to a few ancestors. As discussed above, the chip can operate both in synchronous and self-timed manners. However since a specific machine-tree can be an unbalanced tree, with height close to n, the best implementation for most large chips will be the self-time implementation, or at least a synchronous implementation in which the clock frequency will be determined according to the structure of the specific tree.

Programming the chip consists of three main stages. The first stage is programming the machine structure, by defining the exact contact cuts (or switch states in the dynamic version). The second stage is the transformational programming part, which is carried out as in a conventional processor. The third and last stage is generating the intra-machine signals. The last two stages are carried out in the following manner: Each superstate is programmed into one machine as a flat finite state diagram; namely, all its transitions and transformational commands will be executed as gain a conventional Von-Neumann machine. In addition the processor machine-language will have special commands which produce the intra-machine control signals as also described above. These signals run between machines on the layout that was programmed in the first stage. All these programming details can be extracted from the statechart description automatically by a compiler.

It is to be noted that in FIG. 27 there are at most d 3-tuple (5-tuples for the self-timed implementation) control connections to each machine. Each 3-tuple is for the enter/left/leave control signals, and d such tuples are one for each substate of the machine.

This 'horizontal' coding scheme was chosen for its simplicity, but a 'vertical' coding scheme can be implemented instead. Further, there can be more than d possible states in each machine, out of which d will have substates. The 'horizontal' coding scheme discussed above enables, however, a non-deterministic behavior in the following manner. If two events, which cause two different transitions from an active state, occur simultaneously, then because of the 'horizontal coding scheme, two next-state machines can be activated.

Finally the chip can have control signals coming in and out, and hence enabling its use in a large unit.

DESCRIPTION OF A PREFERRED EMBODIMENT

General

Figure 29:
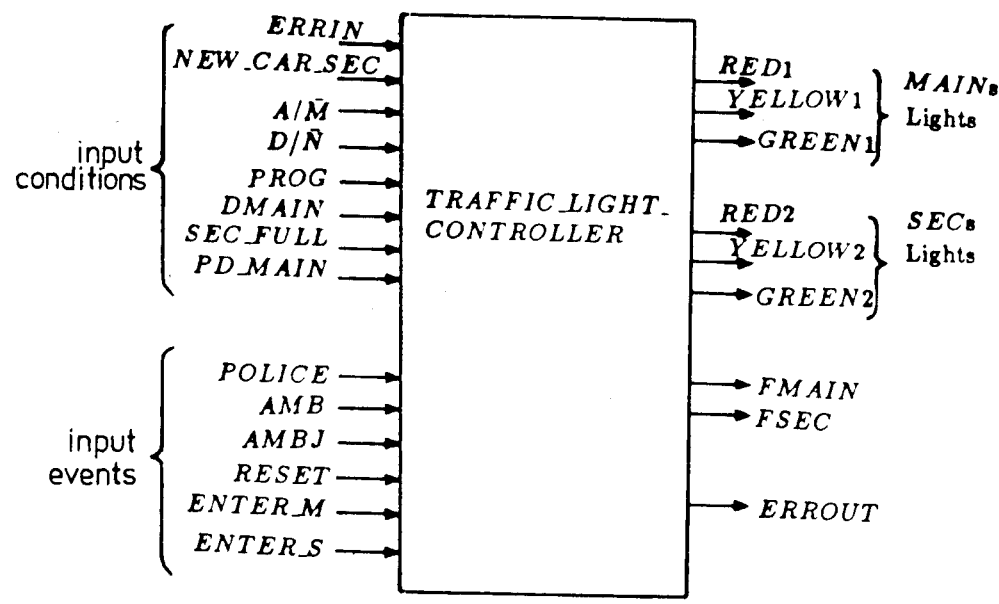
FIG. 29 illustrates the input/output (I/O) interface of one specific implementation in the form of a traffic light controller.
Figure 30:
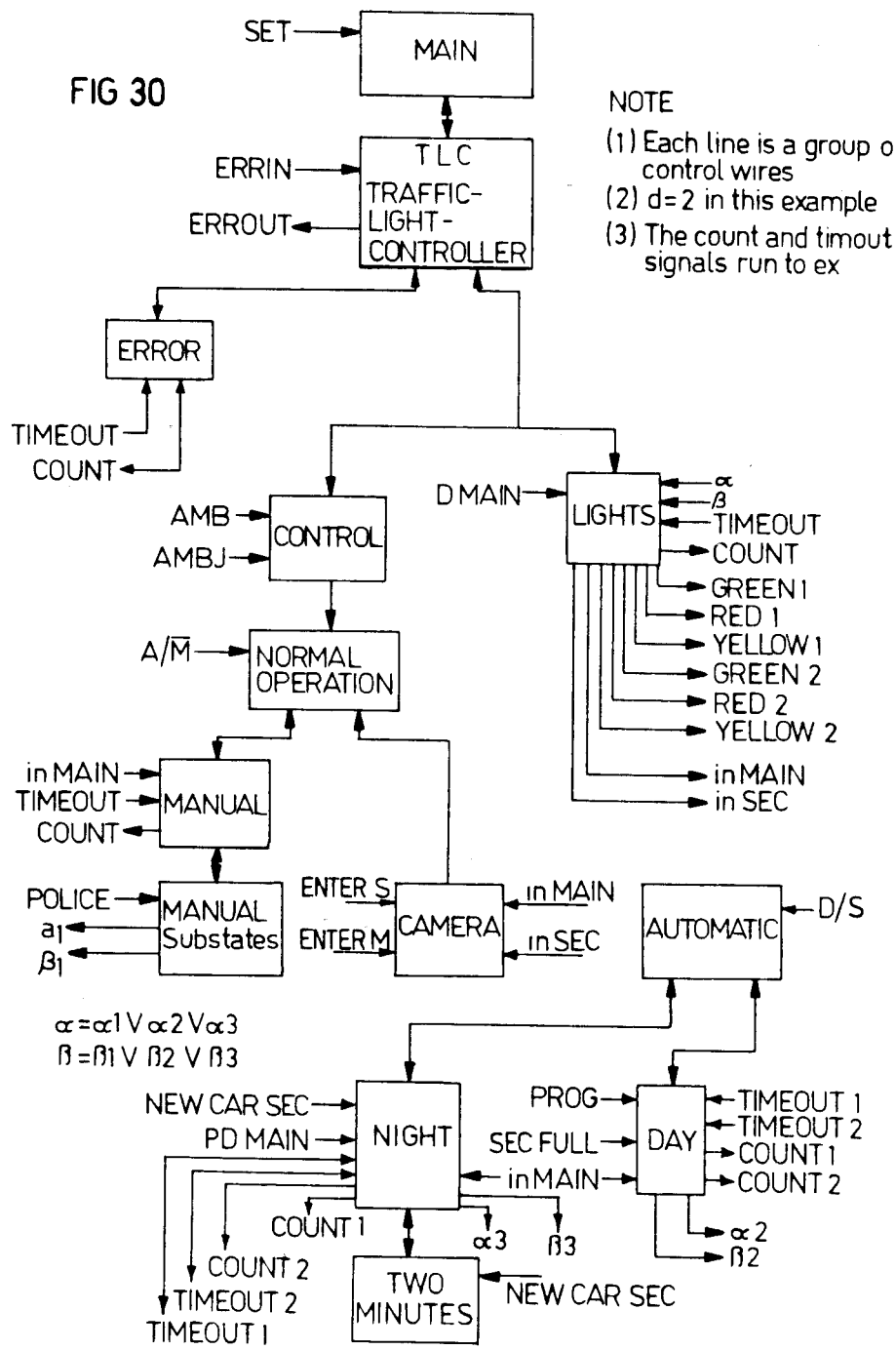
FIG. 30 illustrates a machine tree for the traffic light controller of FIG. 29.
Figure 31A:
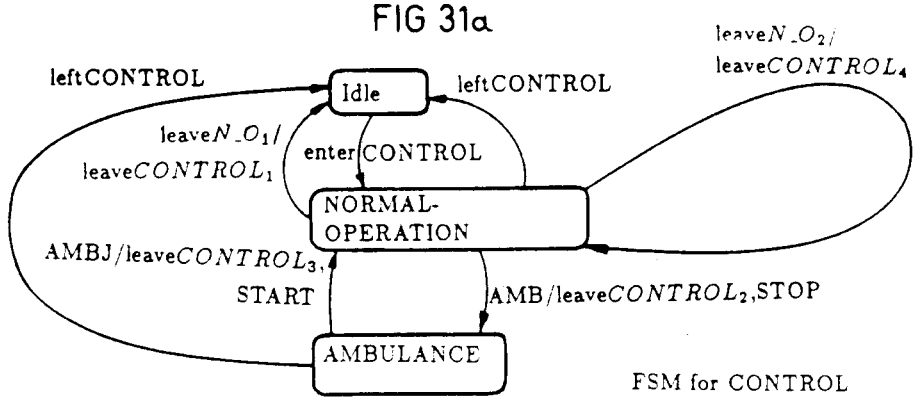
FIGS. 31a–31o illustrate the FSM's for the traffic light controller of FIG. 30.
Figure 31B:
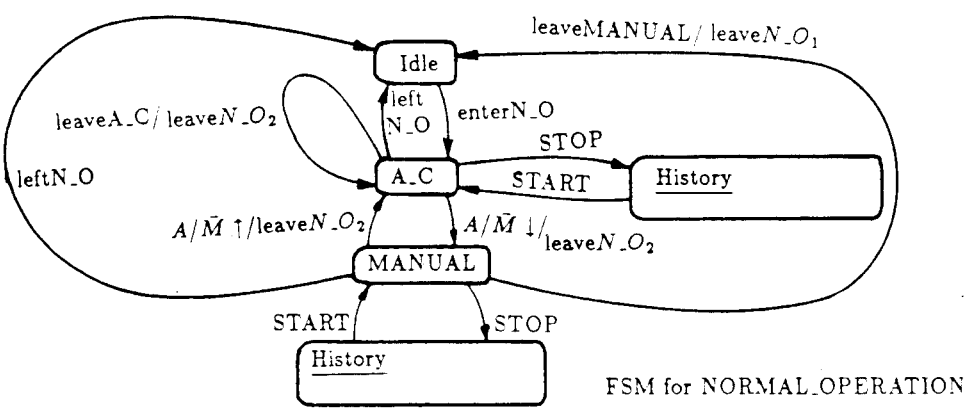
Figures 31N, 31O:
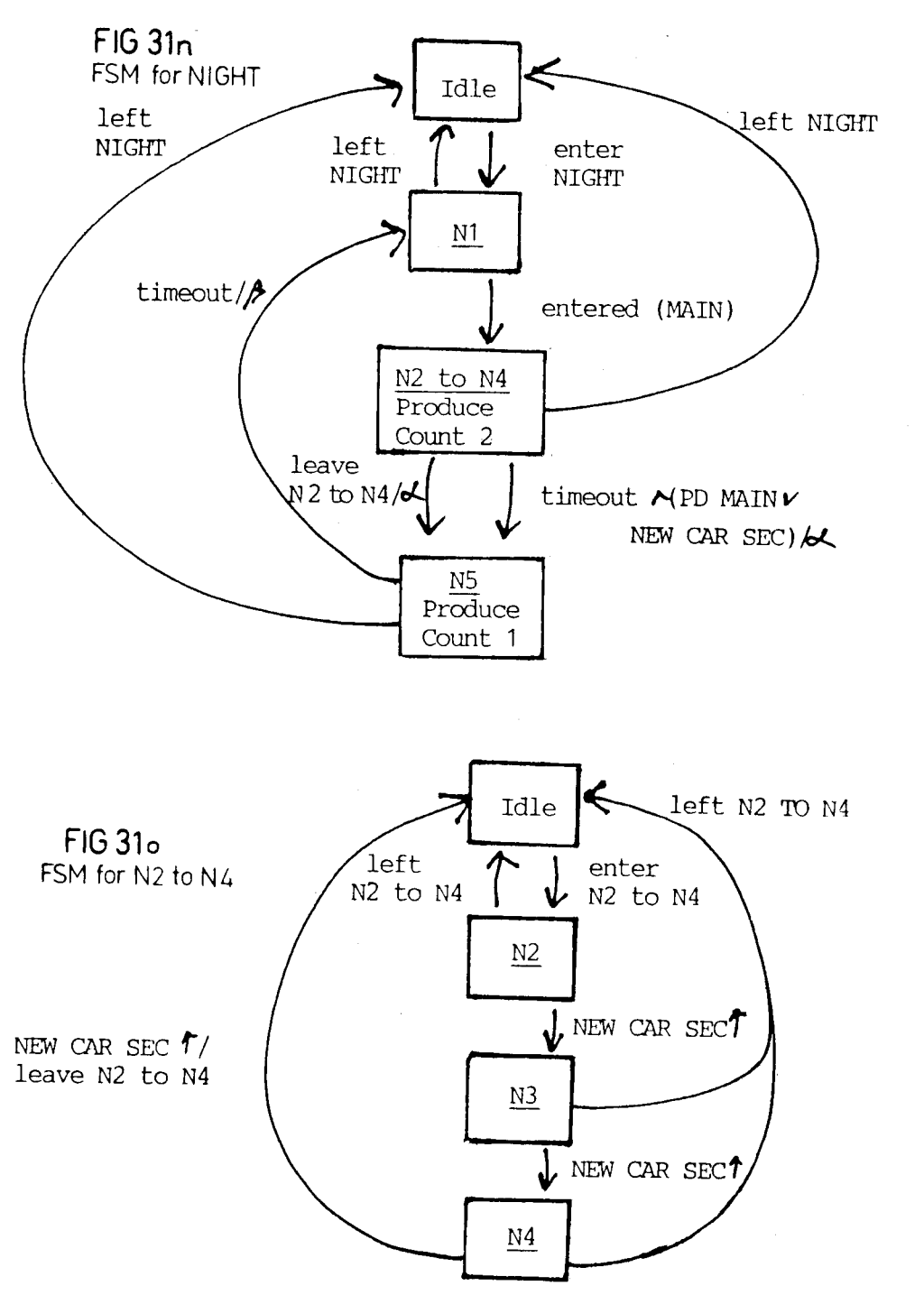
Figure 32A:
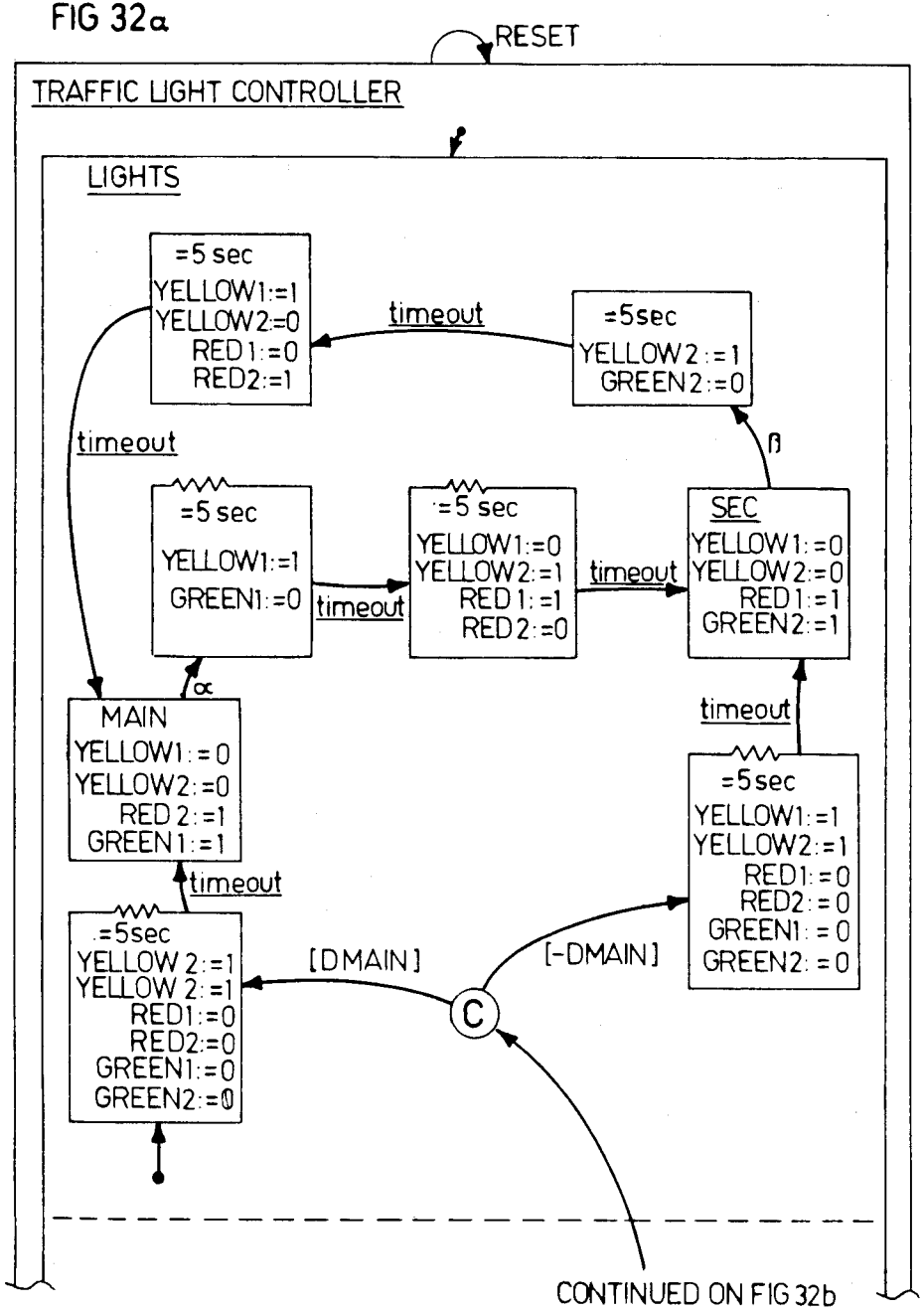
Figure 33:
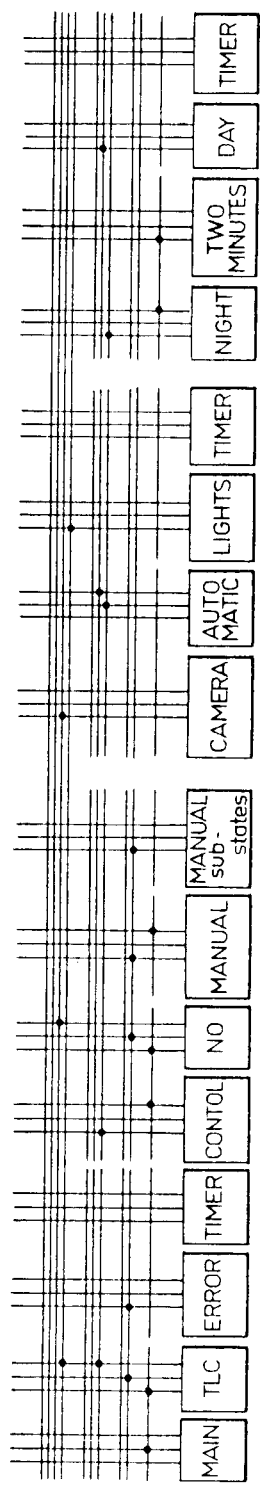
FIGS. 33–35 illustrate three examples of substrate layouts of the traffic light controller of FIG. 30 based on the use of the statechart of FIG. 32 as an abstract model.
Figure 34:
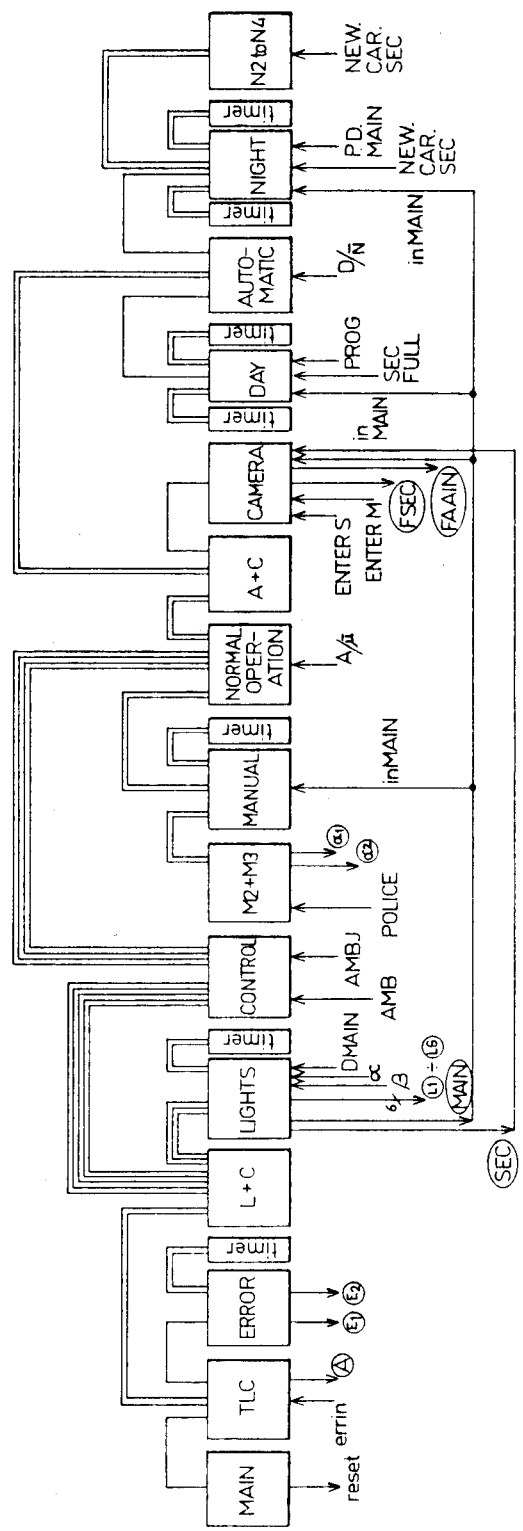
Figure 35:
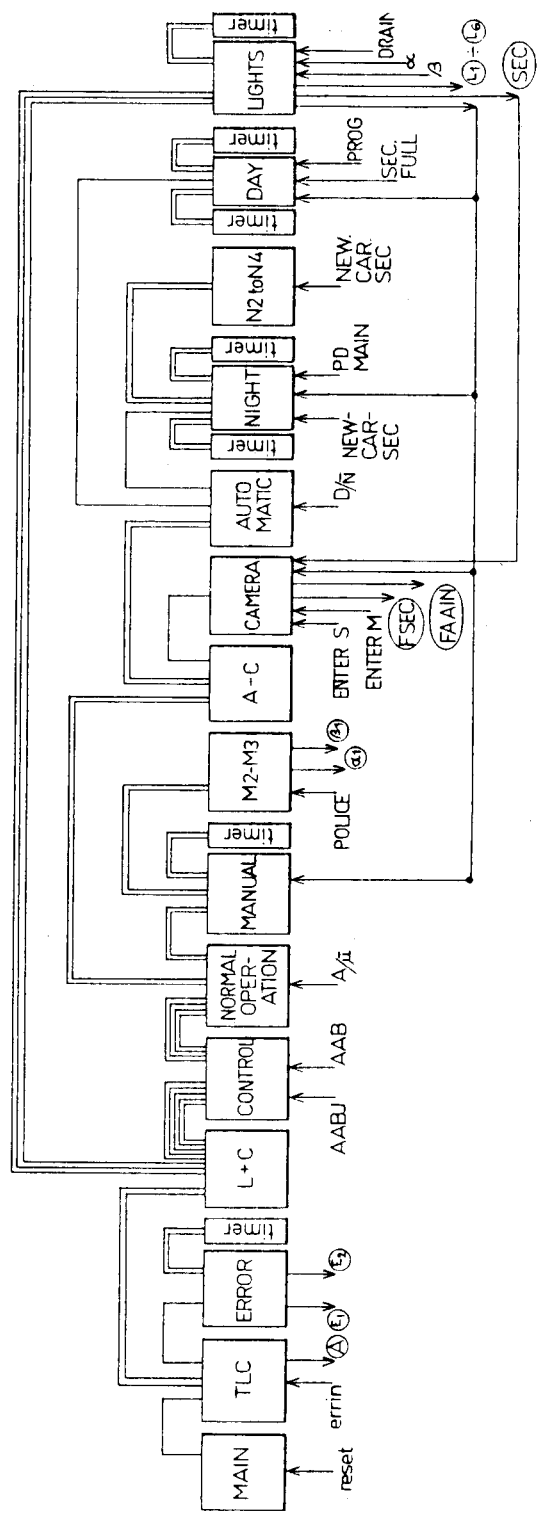

FIGS. 29-35 illustrate a preferred traffic light controller. FIG. 29 illustrates the I/O interface for the traffic light controller; FIG. 30 illustrates the machine-tree for the traffic light controller; FIGS. 31a -31b illustrate two FSM.'s of the traffic light controller; FIGS. 32a and 32b, taken together illustrate complete statechart for the traffic light controller; and FIGS. 33-35 illustrate three implementations of the traffic light controller in accordance with the present invention and based on the abstract model of the statechart of FIG. 32.

Each machine in this example consists of memory (containing the local finite state program) plus control (that fetches the next command from the local memory). In FIG. 30 each communication line represents the control signals discussed earlier, and two 'control buses'. These buses are used in case a substate has several possible entries, for which the bus holds the appropriate entry number, or in case a substate sends a few leave signals to its father.

Traffic Light Controller Operation

The traffic light controller illustrated in FIGS. 25 and 26 includes two sets of lights: one is positioned over the main road (MAIN) entering the cross-junction, and the other is over the secondary road (SEC). During day time (D/N=1) the controller operates according to one of two possible programs: program A (PROG=1) gvves two minutes to the vehicles in MAIN and half a minute to the vehicles in SEC, alternatingly, and program b (PROG=0) gives half a minute to the cars in SEC once the SEC-FULL signal goes high. During the night ((D/N=0) the controller gives precedence to the cars in MAIN until one of the two possibilities occurs: (1) two minutes have passed since MAIN became green and either a pedestrian wants to cross MAIN (PD-MAIN=1), or a new car appeared in SEC (NEW-CAR-SEC=1); or (2) three cars have already appeared in SEC. Once one of these conditions occurs, vehicles in SEC are given half a minute.

The controller can be operated manually as well (A/M=0). In this mode, whenever POLICE becomes 1 (a policeman pushing a button) a transition is triggered from MAIN to SEC or vice-versa. This manual operation, and any transition from day to night and vice-versa, must start with 5 seconds of flashing yellow lights and then MAIN receiving the green lights.

A hidden camera can be operated by the controller when it is in AUTOMATIC mode only. The camera will take a photo of the MAIN entrance to the junction by producing the FMAIN signal, when MAIN is in the red state and the car enters the junction from MAIN (ENTER-M=1), and similarly for the SEC entrance (using the ENTER-S signal, and producing the FSEC signal.

The controller can receive an ambulance signal (AMB =1), notifying the controller than an ambulance is approaching the junction from MAIN (DMAIN=1) or from SEC (DMAIN =0). It should then synchronize the lights according to the direction of the ambulance, and ignore all other events. Once the ambulance enters the junction the controller is notified (AMBJ=1) and should return to its previous operation mode, namely DAY or NIGHT.

The controller can receive an error message (ERRIN=1) and must then flicker both yellow lights. Another possibility for an error occurs when the controller operates manually for more than 15 minutes without the policeman pushing the POLICE button, and then the ERROUT signal should be produced. A RESET signal resets the controller to the AUTOMATIC state.

The foregoing operation of the traffic light controller illustrated in FIGS. 29 and 30 is more particularly described in the FSM's of FIGS. 31a-31o With respect to the FSM's illustrated in these figures, it is to be noted that some input conditions (such as ERRIN) are followed by an upwardly directed arrow ( ); this is to note that the FSM transfers its state according to the appropriate event. For example, in FIG. 31b illustrating the FSM for the traffic light controller TLC, instead of ERRIN entering TLC, the event "ERRIN" should be inputted. With respect to the FSM illustrated in FIG. 31f for the control unit, the Leave Normal Operation One is caused by time out in Manual, and Leave Normal Operation Two is caused by the D/N or a/m symbols. With respect to FIG. 31g illustrating the FSM for Normal Operation, the "History Operation" will be implemented using two dummy states that produce "left" signals to the appropriate sons and from which the "Start" signal causes return by the "History Operation". With respect to FIG. 31h, each entry to $M_1$ and $M_2$ causes a control event that resets the timer.

Statechart Illustration of Controller (FIG. 32)

The traffic light controller is illustrated in a statechart form in FIGS. 32a and 32d also illustrate. The statechart includes exclusive ("or") states (e.g. DAY and NIGHT), and orthogonal ("and") states (e.g. AUTOMATIC and CAMERA). Also included are default entrances (e.g. the entry to WAIT within MANUAL), and entrances by history (e.g. from AMBULANCE upon the event AMBJ, returning by history only one level backwards, i.e. to AUTOMATIC or MANUAL, and then by default). Further included are time bounds on the duration of being in a state (e.g. precisely 5 seconds in six of the states in LIGHTS, and at most 15 minutes in two of the states in MANUAL).

The statechart of FIG. 32 also illustrates conditional connectors (e.g. the entrance to AUTOMATIC dependent upon D/N), and uparrows and downarrows to turn condition changes into events (e.g. D/N~is the event occuring when D/N changes from 0 to 1).

Actions can appear along transitions as in Mealy automata (e.g. is generated when making the transition between two states of MANUAL, triggered by the POLICE event). They can also appear in states as in Moore automata, in which case, by convention, they are carried out upon entrance to the state (e.g. the red and green lights are cleared upon entering ERROR).

The advantages of the statechart description of the traffic light controller will also be apparent from FIGS. 32a and 32b including its ability to provide a hierarchical description in which events affecting one state also automatically effect all substates, and its ability to describe concurrent activities at any hierarchical level and during any time interval. These and further advantages are more completely described in the publications relating to statechart referred to at the beginning of this specification.

Statechart Imolementations of Controller (FIGS. 33–35)

FIGS. 33–35 illustrate three implementations of the traffic light controller based on using the statechart as an abstract model in accordance with the design methodology, and particularly the layout techniques, described above.

FIG. 33 illustrates the matrix technique described above particularly with respect to FIG. 11. In this technique, all the logical networks are disposed in a linear array extending along a first axis (the horizontal axis) on the substrate. The electrical connections to the logical networks comprise a first group of space electrical conductors connected to the logical networks and extending parallel to each other along the vertical axis, and a second group of spaced electrical conductors extending parallel to each other along the horizontal axis and intersecting the first group of conductors.

As shown in FIG. 33 the horizontal conductors include a first plurality $P_1$, most remote from the linear array of logical networks, extending uninterruptedly for the length of the linear array; a second plurality $P_2$ closer to the linear array and extending for the length of the array but interrupted at the one-half way points; a third plurality of conductors $P_3$ closer to the linear array and extending for its length but interrupted at the one-fourth way points; and a fourth plurality $P_4$ also extending for the length of the linear array of networks but interrupted at the one-eighth way points. Electrical connections, such as sodder dots, are applied at the intersection points of selected ones of the first and second group of conductors according to the hierarchy of different network levels and states as illustrated in the tree of FIG. 30.

As described earlier with respect to FIG. 11, this method is based on the fact that any finite tree with "n" vertices and bounded degree "d" can be bisected into two sets of n/2 and n/2 vertices by cutting O(log (n)) edges; and once the cut set is determined, the two sets of vertices can be layed out recursively and combined placing the edge in the cut-set as the horizontal lines in the layout.

It will thus be seen that the electrical connections to the processors in FIG. 33 follow the same hierarchical arrangement as in the machine tree illustrated in FIG. 30. Thus, processor MAIN is connected directly to Traffic Light Control (TLC) processor, whereas TLC processor is in turn connected to the ERROR processor and the LIGHTS and CONTROL processors L+C. Thus, any event affecting the MAIN processor will also automatically affect processors TLC, ERROR, and L+C; and similarly, any events affecting processor TLC will simultaneously affect processors ERROR and L+C.

The LIGHTS processor directly controls the various lights and also a five second timer. Processor CONTROL directly controls processor NO (NORMAL OPERATION), which latter processor directly controls processors MANUAL, AUTOMATIC and CAMERA. Processor AUTOMATIC controls processors NIGHT and DAY. Processor NIGHT controls a two minute timer.

The operation of the traffic light controller illustrated in FIG. 29 is more particularly described in the FSM's or FIGS. 31a–31o and in the statechart of FIG. 32.

FIG. 34 illustrates another implementation of the traffic light controller using the statechart of FIG. 32 as an abstract model. The layout of FIG. 34 utilizes the 1-separator theorem for trees described in Leiserson as discussed above with respect to FIG. 12. Using this theorem, the tree is divided into two parts each consisting of between $\frac{1}{3}n$ and $\frac{2}{3}n$ vertices (i.e. the number of logical networks) by removing O(1) edges. Each part is then laid on recursively in the form of a linerar array along a distinct portion of the substrate, and the removed edges are placed horizontally above to connect the two parts according to the hierarchy of different levels and states as illustrated in the tree of FIG. 30.

It will thus be seen that the traffic light controller illustrated in FIG. 34 provides the same hierarchical levels of control as described above with respect to FIG. 33 and as illustrated in the statechart of FIG. 32.

FIG. 35 illustrates a further layout of the traffic light controller according to the tree of FIG. 30. In the layout of FIG. 35, the tree is divided into a plurality of parts corresponding to the number of verticies (i.e. a logical networks) and each part is laid out recursively in the form of a linear array along a distinct portion of the substrate, and the removed edges are placed horizontally above to connect the plurality of parts according to the hierarchy of different levels and states.

Although in the arrangments illustrated in FIGS. 33–35 the logical networks are all laid out in the form of a linear array constituted of a single line, namely the base line, it will be appreciated that the linear array may be divided into a plurality of linear sections, e.g. two or more separate parallel lines, or folded lines, in order to make best use of the surface area of the chip substrate available.

SUMMARY OF ADVANTAGES

The above-described technique using statecharts as an abstract model for constructing stored-state devices provides a number of important advantages. Layout area can be reduced to $O(n \log (n))$ or even $O(n)$ instead of $O(n^2 \log(n))$ for a PLA Overall performance can be improved to a clock cycle of $O(n \log(n))$ (for a balanced statechart tree) instead of $O(n^2)$ for a PLA. The technique includes other features, one of which is the possibility that the design can be based on several local prom counters, instead of one central PC, removing a traditional 'Von-Neumann' bottleneck (a direction being currently investigated), and enabling the implementation of a history operation using the individual state-memories as history. The methodology further treats concurrency, synchronization and real-time issues in a regular and natural way. In addition, the technique may be implemented in the forum of a hard-wired system, or in a programmable chip in which both the reactive and transformational parts of a reactive system can be programmed.

While the invention has been described with respect to one particular application, namely of a traffic light controller, it will be appreciated that this application is set forth purely for purposes of example, and that the invention could be advantageously applied in many other applications.

What is claimed is:

1. An electronic controller connectible to an external system comprising:
    a plurality of logical networks each capable of assuming a plurality of different states and arranged according to a hierarchy of different networks according to a hierarchy of different states having a one-to-one mapping between states and networks such that any transition between two states affects the two associate networks and their respective lower-order networks;
    each of said logical networks including a storage means for storing its state, means for determining the next state, of the storage means and means for receiving control signals from, or for outputting control signals to, the immediately higher level logical network and the immediately lower level logical network for determining their respective states;
    at least some of said logical networks including means for receiving control signals from, or for outputting control signals to, the external system;
    said logical networks being disposed on a substrate;
    and a plurality of electrical connections on the substrate connecting the logical networks to provide said one-to-one mapping between states and networks.

2. The electronic controller according to claim 1, wherein said logical networks are disposed on the substrate in the form of at least one linear array of networks.

3. The electronic controller according to claim 1, wherein all of said logical networks are disposed in a line extending along a first axis on said substrate; said electrical connections comprising:
    a first group of spaced electrical conductors connected to said logical networks and extending parallel to each other along a second axis perpendicular to said first axis;
    a second group of space electrical conductors extending parallel to each other along said first axis and intersecting said first plurality of electrical conductors;
    and electrical connections at the intersection points of selective ones of said first and second groups of conductors to provide said one-to-one mapping between state and networks.

4. The controller according to claim 2, wherein said linear array extends along one orthogonal axis on the substrate, and said electrical connections comprise:
    a first group of spaced electrical conductors connected to said logical networks and extending parallel to each other along a second orthogonal axis;
    and a second group of spaced electrical conductors extending parallel to each other along said first axis for the length of said linear array; said second group of electrical conductors including:
    a first plurality of electrical conductors remote from the linear array of logical networks and extending uninterruptedly for the length of the linear array;
    a second plurality of electrical conductors closer to the linear array than said first plurality and extending for the length of said linear array but interrupted at the one-half point; and
    a third plurality of conductors closer to the linear array than said second plurality and extending for the length of the linear array but interrupted at the one-quarter way points;
    said plurality of electrical connections being at the intersection points of selected ones of said conductors according to said one-to-one mapping between states and networks.

5. The controller according to claim 1, wherein said logical networks are divided into two parts each including from ¼ to ¾ of the total number of logical networks;
    each of the two parts being laid out recursively in the form of a linear array along a distinct portion of the substrate;
    said electrical connections connecting the two parts of the logical networks according to said one-to-one mapping between states and networks.

6. The controller according to claim 1, wherein said logical networks are divided into a plurality of parts corresponding to the number of immediate sub-states in the hierarchy;
    each part being laid out recursively in the form of a linear array along a distinct portion of the substrate;
    said electrical connections connecting the plurality of parts of the logical networks according to said one-to-one mapping between states and networks.

7. The controller according to claim 1, wherein each of said different network levels is implemented as hard-wired circuitry.

8. The controller according to claim 1, wherein each of said different network levels is programmed into a memory.

9. The controller according to claim 1, wherein the controller is a traffic light controller controlling a first set of lights positioned over a main road, and a second set of lights positioned over a secondary road intersecting the main road.

* * * * *